United States Patent [19]
Jones et al.

[11] Patent Number: 6,061,484
[45] Date of Patent: May 9, 2000

[54] ADD/DROP MULTIPLEXER

[75] Inventors: Kevan Peter Jones, Devon; Martin J. Pettitt, Essex, both of United Kingdom

[73] Assignee: Alcatel, Paris, France

[21] Appl. No.: 09/000,432

[22] PCT Filed: Aug. 2, 1996

[86] PCT No.: PCT/GB96/01891

§ 371 Date: Apr. 9, 1998

§ 102(e) Date: Apr. 9, 1998

[87] PCT Pub. No.: WO97/06614

PCT Pub. Date: Feb. 20, 1997

[30] Foreign Application Priority Data

| Aug. 4, 1995 | [GB] | United Kingdom | 9516014 |
| Aug. 4, 1995 | [GB] | United Kingdom | 9516016 |
| Aug. 4, 1995 | [GB] | United Kingdom | 9516018 |
| Oct. 25, 1995 | [GB] | United Kingdom | 9521839 |
| Dec. 21, 1995 | [GB] | United Kingdom | 9526186 |

[51] Int. Cl.$^7$ ................................................. G02B 6/28
[52] U.S. Cl. ............................................ 385/24; 359/127
[58] Field of Search ..................... 385/24, 147; 359/127

[56] References Cited

FOREIGN PATENT DOCUMENTS

| 0 410 712 A1 | 1/1991 | European Pat. Off. . |
| 0 666 485 A1 | 8/1995 | European Pat. Off. . |
| 0 677 935 A1 | 10/1995 | European Pat. Off. . |
| 7-270641 | 10/1995 | Japan . |

OTHER PUBLICATIONS

C. Dragone et al, Integrated Optics NxN Multiplexer on Silicon, IEEE Photonics Technology Letters, vol. 3, No. 10, Oct. 1991, pp. 896–899.

Y. Inoue et al, "Silica–based arrayed–waveguide grating circuit as optical splitter/router", Electronics Letters, Apr. 27$^{th}$, 1995, vol. 31, No. 9, pp. 726–727.

K. Okamoto et al, "16–channel optical add/drop multiplexer using silica based arrayed–waveguide gratings", Electronics Letters, Apr. 27$^{th}$, 1995, vol. 31, No. 9, pp. 723–724.

C. R. Giles et al, "Bidirectional Transmission to Reduce Fiber FWM Penalty in WDM Lightwave Systems", AT&T Bell Laboratories, ThD12–2/77.

I. Bennion et al, "High–Reflectivity Monomode–Fibre Grating Filters", Electronics Letters, Mar. 13, 1986, vol. 22, No. 6, pp. 341–343.

P. E. Dyer et al, "Amplification of fibre Bragg grating reflectivity by post–writing exposure with a 193 nm ArF laser", Electronics Letters, Jul. 7, 1994, vol. 30, No. 14, pp. 1133–1134.

B. Malo et al, "Apodised in–fibre Bragg grating reflectors photoimprinted using a phase mask", Electronics Letters, Feb. 2$^{ND}$, 1995, vol. 31, No. 3, pp. 223–225.

J. Albert et al, "Aprodisation of the spectral response of fibre Bragg gratings using a phase mask with variable diffraction efficiency", Electronics Letters, Feb. 2$^{nd}$, 1995, vol. 31, No. 3, pp. 222–223.

(List continued on next page.)

*Primary Examiner*—Akm E. Ullah
*Attorney, Agent, or Firm*—Sughrue, Mion, Zinn Macpeak & Seas, PLLC

[57] ABSTRACT

A number of add/drop multiplexers comprising passive optical components for wavelength division multiplexing are described. These add/drop multiplexers are particularly adapted for use in branching units (10) of scuh networks to allow signals passing along fibres (1, 2, 11, 12) of a main trunk between terminal stations (20, 30) to be dropped to and added from a spur station (40), the design of the add/drop multiplexers allowing a reduced number of spur fibres (3, 13) to be used as signals are routed between trunk fibers (1, 2, 11, 12) at spur fires (3, 13) according to carrier wavelength.

20 Claims, 18 Drawing Sheets

OTHER PUBLICATIONS

C. R. Giles et al, Low–Loss Add/Drop Multiplexers for WDM Lightwave Networks, AT&T Bell Laboratories, ThC2–1, Oct. 10, 1995, pp. 66–67.

A. Willner et al, "Optically–amplified WDM ring network incorporating channel–dropping filters", IEEE Photonics Technology Letters, Jun. 1994, US, vol. 6, No. 6, ISSN 1041–1135, pp. 760–763, SP000457241.

M. J. Chawki et al, "Wavelength reuse scheme in a WDM unidirectional ring network using a proper fibre grating add/drop multiplexer", Electronics Letters, Mar. 16, 1995, UK, vol. 31, No. 6, ISSN 0013–5194, pp. 476–477, XP000530329.

F. Bilodeau et al, "An all–fiber dense wavelength–division multiplexer/demultiplexer using photoimprinted Bragg gratings", IEEE Photonics Technology Letters, Apr. 1995, USA, vol. 7, No. 4, ISSN 1041–1135, pp. 388–390, XP002017501.

M. Fukutoku et al, Wavelength–Division–Multiplexing Add/Drop Multiplexer Employing a Novel Polarisation Independent Acousto–Optic Tunable Filter, Electronics Letters, May $13^{th}$, 1993, vol. 29, No. 10, pp. 905–907.

G. R. Hill, "A wavelength routeing approach to optical communication networks", BR Telecom Technology Journal, vol. 6, No. 3, Jul. 1988, pp. 24–31.

Kazuhiro Oda et al, "An Optical FDM–Add/Drop Multiplexing Ring Network Utilizing Fiber Fabry–Perot Filters and Optical Circulators", IEEE Photonics Technology Letters, vol. 5, No. 7, Jul. 1993, pp. 825–829.

A. Hamel et al, "Optical Filters in WDM Ring Network Architectures", Proceedings of the SPIE, The International Society for Optical Engineering, vol. 2449, pp. 70–77.

T. J. Cullen et al, "Compact all–fibre wavelength drop and insert filter", Electronics Letters, Dec. $8^{th}$, 1994, vol. 30, No. 25, pp. 2160–2162.

D. C. Johnson et al, New Design Concept for a Narrowband Wavelength–Selective Optical Tap and Combiner, Electronics Letters, Jun. $18^{th}$, 1987, vol. 23, No. 13, pp. 668–669.

ADD/DROP MULTIPLEXER

The present invention relates to an add/drop multiplexer for wavelength division multiplexing. The invention is especially directed to use with fibre optic cables, in particular to use as a branching unit adapted for use in a fibre optic network. The invention further relates to such fibre optic networks, particularly in the context of submarine cable systems employing fibre optic cables.

Wavelength division multiplexing, termed WDM, (discussed in, for example, Hill, British Telecom Technology Journal 6(3): 24–31) is a technique of considerable benefit in optimising transmission of signals through fibre optic networks. In wavelength division multiplexing, traffic signals to be sent out by a station are modulated on to a number of carrier signals at different predetermined carrier wavelengths. Each predetermined carrier wavelength is allocated according to the identities of the send station and of the intended receive station. Predetermined carrier wavelengths will be spaced sufficiently far apart in wavelength that they can be discriminated from each other by components of the fibre optic system, but in many networks will need to be grouped sufficiently closely that all carrier wavelengths can be amplified satisfactorily by the same amplifier in a repeater (or in unrepeatered systems, to be carried long distances without significant loss). The carrying capacity of a single fibre is enhanced by WDM—rather than carrying a single signal, the fibre is simultaneously carrying several signals, each of a different wavelength.

Most such transmission networks have a number of nodes at which one or more branches form away from a main trunk or ring. Typically, at these nodes one or more carrier wavelengths are dropped down one fibre of the branch and one or more carrier wavelengths (which may be the same as, or different from, those dropped from the trunk or ring) are added to the trunk or ring from another fibre of the branch. The component which performs such a function is an Add/Drop Multiplexer (ADM).

WDM is particularly well adapted to efficient routing of signals between send and receive stations. As different signals have different carrier wavelengths, optical components can be used to route signals appropriately by directing them according to the carrier wavelength of the signal.

This can be done in an active manner, by splitting the signal into its component carrier wavelengths with a prism or similar component, and actively processing and routing the split signals to desired outputs. This solution is appropriate for use in an integrated device: a basic design for a multiplexer of this type is discussed in Dragone et al in IEEE Photonics Technology Letters 3(10):896–899, and designs employing arrayed-waveguide gratings are disclosed for an ADM in Okamoto et al in Electronics Letters 31(9):7234 and for an optical splitter/router in Inoue et al in Electronic Letters 31(9):726–7. A difficulty with such silicon-based components is a lack of flexibility: to perform a specific add-drop function for particular wavelengths, a specific device will need to be fabricated. In a network it will be necessary for different nodes to add, drop, or pass different combinations of carrier wavelengths: with integrated components of the type described, it may prove necessary to fabricate different components for each node. This could require a different mask to be prepared for each component, and would as a consequence be likely to be prohibitively expensive for a customized network.

Alternatively, essentially passive optical components can be used which respond differently to different carrier wavelengths. This enables an essentially passive network to be constructed.

An example of an appropriate wavelength-sensitive optical component is a fibre Bragg grating. Fibre Bragg gratings are discussed in Bennion et al, Electronics Letters, Vol. 22, 341–343, 1986. A Bragg grating is a notch reflection filter. Light is transmitted through the grating at all wavelengths apart from those falling within a narrow wavelength band. Light within the band is substantially totally reflected. With an appropriate spacing of carrier wavelengths in a WDM system, a fibre Bragg grating can be adapted to reflect only one of the carrier wavelengths and allow the others to pass.

An alternative approach to producing a practical ADM, employing fibre Bragg gratings, is proposed in Johnson et al in Electronics Letters 23(13):668–9. Refinements are shown in Cullen et al, Electronics Letters, Vol. 30, 2160–2162, 1994, and Bilodeau et al, IEEE Photonics Technology Letters, Vol. 7, 388–390,1995. This ADM is an optical tap comprising a Mach-Zehnder interferometer. This optical tap is illustrated in FIG. 1. It comprises two input fibres 101,102 and two output fibres 103,104, two 3 dB directional couplers 105 which split input light equally between output paths, and two interferometer arms of identical path length linking the couplers. In each arm there is a Bragg reflection filter 106 which passes light at wavelengths $\lambda_1$, $\lambda_2$, $\lambda_3$, but which reflects light at $\lambda_0$. Light at wavelengths $\lambda_1$, $\lambda_2$, $\lambda_3$ passes from input 101 through both arms. It then combines constructively at output 103 and is transmitted out through it: however it combines destructively at input 102 (because of the phase shift introduced) and is not transmitted. Light at wavelength $\lambda_0$ is reflected by both Bragg reflection filters, and in the same manner combines constructively to be transmitted through output 104 but combines destructively at input 101. An all-fibre mutiplexer/demultiplexer of this type is disclosed in Bilodeau et al in IEEE Photomics Technology Letters 7(4):388–390. For an ADM of this kind to function, it is critical that the Bragg reflection filters are identical and that the optical paths in the interferometer branches are identical. This arrangement is thus highly sensitive and would be more so where more than the adding or dropping a single wavelength from a single trunk fibre is required.

It is necessary for proper operation of the device, as is indicated above, for the optical path of both "arms" of the interferometer to be balanced. Adjustment means can be provided for this purpose, to compensate for, for example, temperature variation. One means of balancing the optical paths is by preparing the device, including writing the gratings onto the fibres, and then exposing one of the arms to uniform UV light to photoinduce an average index change in the fibre core (UV trimming). The resulting device is an add/drop multiplexer in the form of a Mach-Zehnder interferometer. This device is shown schematically in FIG. 2. The Mach-Zehnder interferometer add/drop multiplexer 255 has two inputs, for the trunk input 251 and the branch add fibre 253, and two outputs, for the trunk output 252 and the branch drop fibre 254. There are two "normal paths"—from first input to first output and from second input to second output—which are followed for all signals except for those at carrier wavelength $\lambda_1$, which are rerouted to the other one of the two outputs. This device gives a simple and useful add/drop functionality, but is disadvantageous in that two fibres (an add fibre and a drop fibre) are required in the branch for each trunk fibre. This arrangement does require the use of twice as many amplifiers on the spurs as on the main trunk.

A ring system employing fibre grating filters which reflect at a given one of the wavelengths used in the system is disclosed in Chawki et al, Electronics Letters 31(6)

:476–7. Each ADM node in the system, which is unidirectional, comprises a 2 fibre to 1 fibre coupler, a fibre grating filter which reflects at a wavelength $\lambda_1$ to be dropped and added at the ADM, but which transmits at other wavelengths used, and a second 2 fibre to 1 fibre coupler. At the input side of the first 2 fibre to 1 fibre coupler are the input fibre from the ring and the output fibre to the branch, and at the output side is the fibre grating filter. The signal from the ring fibre passes through the coupler to the filter, but the signal at $\lambda_1$, is reflected and passes to the branch through the output fibre. The transmitted signal goes to an input of the second 2 fibre to 1 fibre coupler, the other input being connected to an input fibre from the branch so that a new signal at wavelength $\lambda_1$ can be added. This arrangement does provide an ADM, but a large number of components would be required if such an arrangement was to be employed in a more complex system as a fibre pair is required for each carrier wavelength to be dropped and added.

The use of three-port optical circulation in combination with Bragg gratings in the context of a WDM system is disclosed in Giles & McCormick, ThD 12:76–79. An optical circulator is a device in which light entering at one port is transmitted out through a specific subsequent port (and no other), the ports of the circulator thus forming a sequence. An ADM using this approach is disclosed in Giles & Mizrahi IOOC 95, ThC2-1 pages 66–67, and is illustrated in FIG. 3. A transmission at input 111 with carrier wavelengths $\lambda_1$, $\lambda_2$, $\lambda_3$ enters first circulator 115. The whole transmission passes out through the second port of the circulator to grating 116, which reflects the $\lambda_1$ component but allows the $\lambda_2$ and $\lambda_3$ components to pass. The $\lambda_1$ component thus returns to the second port of the first circulator 115, passes through to the next port in sequence, the third port, and thus passes out along drop branch 113. The added signal at carrier wavelength $\lambda_1$ from add branch 114 enters the first port of the second circulator 117 and exits through the second port towards grating 116, which reflects it. The added $\lambda_1$ signal thus joins the $\lambda_2$ and $\lambda_3$ signals of the main transmission in entering the second port of second circulator 117, and all three carrier wavelengths thus pass out through the third port of the second circulator 117. Such an ADM is effective for adding and dropping signals at a given wavelength to a single line, but complex networks would require a large number of such ADMs to be used.

There exists the need for an ADM which can be used in practical communication systems and which has a minimum number of components. It is desired for these components to be highly stable, and for there to be as little need as possible for matching components of the system to each other. In particular, it is desired to provide an ADM which is adapted for use in a practical two-way fibre optic system, with a pair of fibres carrying signals in opposite directions, to allow signals to be added from and dropped to a branch.

Accordingly, in a first aspect the invention provides an add/drop multiplexer for use in optical wavelength division multiplexing, the add/drop multiplexer having a first trunk input port for receiving traffic signals from a first part of a first trunk fibre, a second trunk input port for receiving traffic signals from a first part of a second trunk fibre, a first trunk output port for outputting traffic signals to a second part of the first trunk fibre, a second trunk output port for outputting traffic signals to a second part of the second trunk fibre, and a branch input for receiving traffic signals from a branch input fibre, and/or a branch output for outputting traffic signals to a branch output fibre; the add/drop multiplexer comprising: means for routing from the first trunk input to the branch output a first set of traffic signals at carrier wavelengths predetermined for transmission of signals from the first trunk fibre to the branch station and for routing from the second trunk input to the branch output a second set of traffic signals at carrier wavelengths predetermined for transmission of signals from the second trunk fibre to the branch station, and means for combining said first and second sets of traffic signals for output at the branch output; and/or means for separating traffic signals received at the branch input into a third set of traffic signals at carrier wavelengths predetermined for transmission of signals from the branch station to the first trunk fibre and a fourth set of traffic signals at carrier wavelengths predetermined for transmission of signals from the branch station to the second trunk fibre, and means for routing the third set of traffic signals to the first trunk output and the fourth set of traffic signals to the second trunk output respectively.

The branch input and branch output may be to and from a common input/output branch fibre.

The invention may provide an add/drop multiplexer as previously defined for use in an optical wavelength division multiplexing system in which specific carrier wavelengths are assigned for transmission between different stations in the system, said add/drop multiplexer comprising signal splitting means to split the traffic signals input from each of said input ports into signals for provision to selected output ports in accordance with a routing determined by the carrier wavelengths of said traffic signals; signal coupling means for providing output traffic signals at each of said output ports, wherein for each one of said trunk output ports traffic signals from the corresponding trunk input port and from the branch input port at carrier wavelengths selected for routing to that trunk output port are combined for output to that trunk fibre, and wherein for the branch output port traffic signals from the trunk input ports at carrier wavelengths selected for routing to the branch station are combined for output on the branch output fibre.

The invention also provides a branching unit for use in a fibre optic network comprising an add/drop multiplexer as previously defined. The invention further provides a fibre optic network, comprising two terminal stations, two or more trunk fibres for connecting said two terminal stations, one or more branch stations each connected by a spur fibre to a fibre trunk defined by said two or more trunk fibres, and one or more branching units as indicated above on the fibre trunk each to allow exchange of traffic signals combined for output on the branch output fibre.

In a fourth aspect, the invention provides an add/drop multiplexer for use in an optical wavelength division multiplexing system in which the routing of traffic signals is determined by specific carrier wavelengths provided for said traffic signals, said add/drop multiplexer comprising: three or more four port optical circulators, respective ports of each optical circulator being connected to form a network; an input port and an output port for a first trunk fibre, for providing signals to and receiving signals from, respectively, designated ports of said three or more optical circulators; an input port and an output port for a second trunk fibre, for providing signals to and receiving signals from, respectively, designated ports of said three or more optical circulators; an input port and an output port for each of one or more branch fibres, for providing signals to and receiving signals from, respectively, designated ports of said three or more optical circulators; wherein one or more notch reflection filters are provided on said network between adjacent optical circulators for transmission of signals at predetermined ones of said specific carrier wavelengths and for reflection of signals at others of said specific carrier wavelengths, thereby routing signals from said input ports to designated ones of said output ports.

In a fifth aspect, the invention provides an add/drop multiplexer for use in an optical wavelength division multiplexing system, said add/drop multiplexer comprising a plurality of interconnected basic multiplexer units, each said basic multiplexer unit comprising a first input, a first output, a second input and a second output, and further comprising routing means such that signals at one or more predetermined carrier wavelengths are routed from the first input to the second output and from the second input to the first output, but such that signals at other carrier wavelengths are routed from the first input to the first output and from the second input to the second output.

In a sixth aspect, the invention provides an add/drop multiplexer for use in optical wavelength division multiplexing, said add/drop multiplexer having a first trunk input port for receiving traffic signals from a first part of a first trunk fibre and a first trunk output port to provide traffic signals to a second part of the first trunk fibre, a second trunk input port for receiving traffic signals from a first part of a second trunk fibre and a second trunk output port to provide traffic signals to a second part of the second trunk fibre, and first and second branch input/output ports for receiving signals from and providing signals to branch fibres, wherein the add/drop multiplexer is adapted both to input one or more branch input signals and output one or more branch output signals at each of said input/outputs.

In a seventh aspect, the invention provides an add/drop multiplexer for use in optical wavelength division multiplexing, said add/drop multiplexer having a first trunk input port for receiving traffic signals from a first part of a first trunk fibre and a first trunk output port to provide traffic signals to a second part of the first trunk fibre, a second trunk input port for receiving traffic signals from a first part of a second trunk fibre and a second trunk output port to provide traffic signals to a second part of the second trunk fibre, and first and second branch ports for receiving signals from and providing signals to a branch station, wherein the add/drop multiplexer comprises: a first and a second five-port optical circulator for routing according to carrier wavelength to the branch station via the branch ports designated signals from the first and second trunk input ports, and for routing according to carrier wavelength to the first and second trunk output ports designated signals from the branch ports.

In at least the sixth and seventh aspects, the add/drop multiplexer may also comprise an exchange circuit which is adapted for connection to a branch input port, a branch output port, the first branch port and the second branch port, and adapted for receiving signals from a branch station through the branch input port and for routing them to the first branch port or the second branch port according to carrier wavelength, and further adapted for receiving traffic signals from the first branch port and the second branch port and for combining them for routing to the branch output port.

The invention also provides a branching unit for use in a fibre optic network comprising an add/drop multiplexer as indicated in any of the preceding aspects. The invention further provides a fibre optic network, comprising two terminal stations, two or more trunk fibres for connecting said two terminal stations, one or more branch stations each connected by a spur fibre to a fibre trunk defined by said two or more trunk fibres, and one or more branching units as indicated above on the fibre trunk each to allow exchange of traffic signals between said trunk fibres and one or more of said spur fibres. Advantageously, such a fibre optic network is adapted such that a substantial part of said fibre trunk comprises submarine cable, and in that said one or more branching units are adapted for submarine use.

Specific embodiments of the invention are described below, by way of example, with reference to the accompanying Figures, of which:

Figure 4:
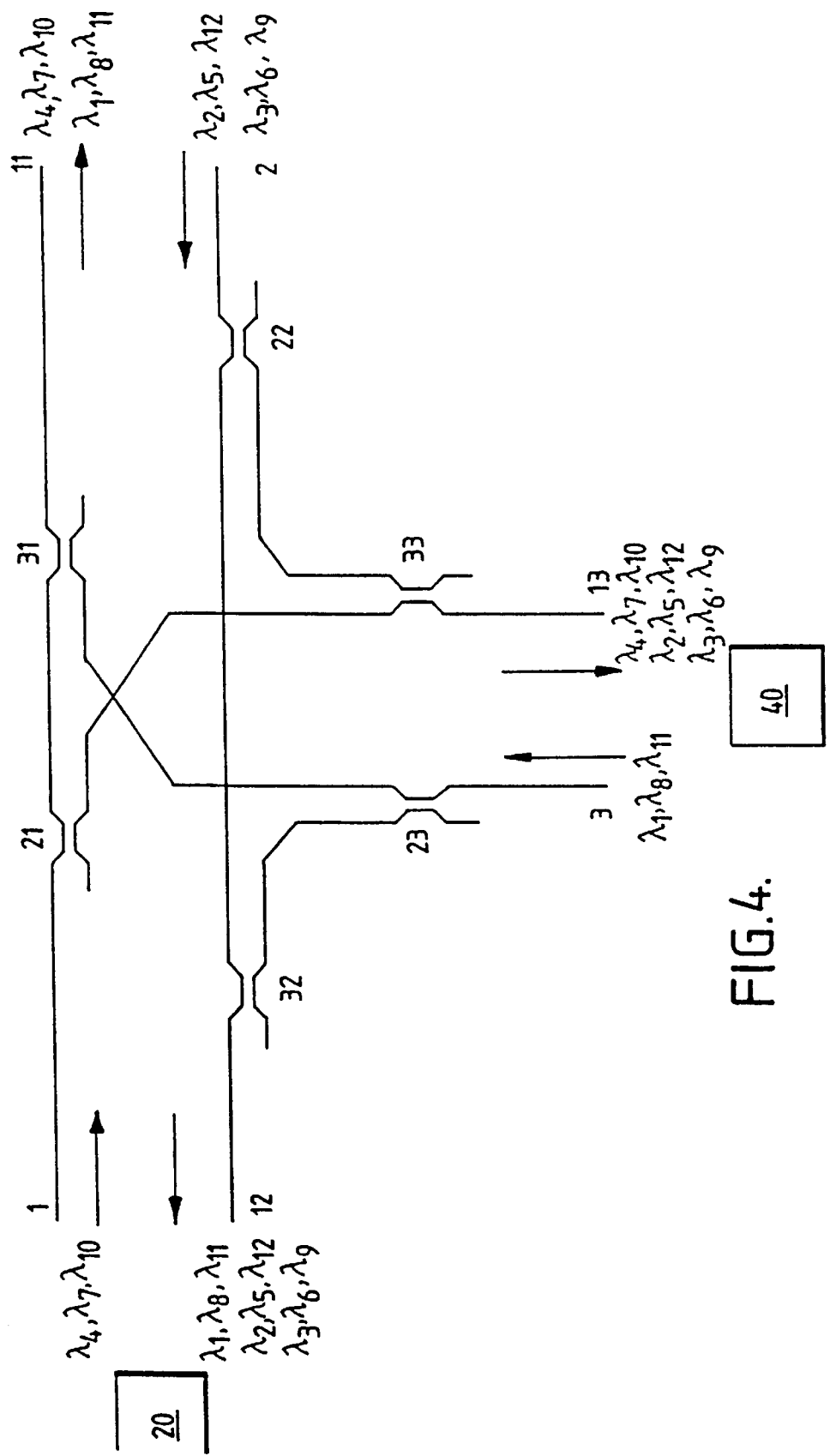
FIG. 4 shows a basic example of the coupling scheme employed in the first to fourth embodiments of the invention.

FIG. 4 illustrates a basic coupling scheme used for the first to fourth embodiments of the invention. A first fibre optic line enters at first input port 1 and exits through first output port 11. A second fibre optic line, paired with the first fibre optic line but carrying signals in the opposite direction, enters at second input port 2 and exits at second output port 12. In the arrangement as shown in FIG. 4, the branch point shown is at the end of a chain, so the fibres from first input port 1 and second output port 12 lead to a branch of the system, whereas the fibres from first ioutput port 11 and second input port 2 lead to the next node of the system.

Signals are dropped to branch output port 13 and are added from branch input port 3. Routing of signals from the input ports to the appropriate output ports is achieved by two sets of components. Firstly, the signal from each input port is split into parts, with a part directed towards the output ports other than the one associated with that input port. This is achieved here by 3 dB fibre optic couplers 21, 22, 23. For example, from first input port 1 the signal is transmitted to a first side of the fibre optic coupler 21. There is only one fibre connected to this first side of the coupler. On the second side of the coupler 21, there are two intermediate fibres, one directed to each of the output ports 11, 13 previously indicated. The second step is the combination of the signals in the relevant pair of intermediate fibres to provide the signal for each output port. This is in this case achieved with 3 dB fibre optic couplers 31, 32, 33. For example, one intermediate fibre from coupler 23 and another intermediate fibre from coupler 21 are connected to a first side of fibre optic coupler 31. At the second side of coupler 31 there is only a single fibre connected to first output port 11, so signals from the first port (via coupler 21) and the branch input port (via coupler 23) are coupled and transmitted out through the first output port 11.

In an arrangement such as that depicted in FIG. 4, it is necessary for there to be a unique wavelength for transmissions from each station on the system to every other station: it is not even possible for transmissions between two stations to use the same carrier wavelength for forward and reverse transmissions. In the FIG. 4 arrangement, it is thus necessary for each station to be provided with appropriate circuitry for selecting out each carrier wavelength so that the different incoming transmissions can be isolated and detected.

In such an arrangement, there is a potential security problem. All signals are transmitted down the branch to the station at the end of the branch, and thus the branch station is capable of receiving all transmissions sent along the main trunk, even when these are not intended to be received by the branch station. Even if the branch station is provided with electronic circuitry adapted only to detect signals on the wavelengths assigned to it, the possibility would exist for retuning or replacing the circuitry provided to enable access to traffic sent between other stations. Losses are also extremely high. This arrangement is thus of limited use in practice.

There is therefore a need to develop arrangements which do not have such problems of security. In a submarine cable system, security can be provided if signals not intended for a branch station are not allowed by the ADM for that branch to be transmitted out onto the branch drop fibre. Submarine cables are typically laid on the sea bottom such that branching units (and hence ADMs) would be typically 30 to 50 miles offshore: the main trunk of the network is thus essentially inaccessible and the risk of access by a third party to a transmission between two other parties is remote.

Figure 5:
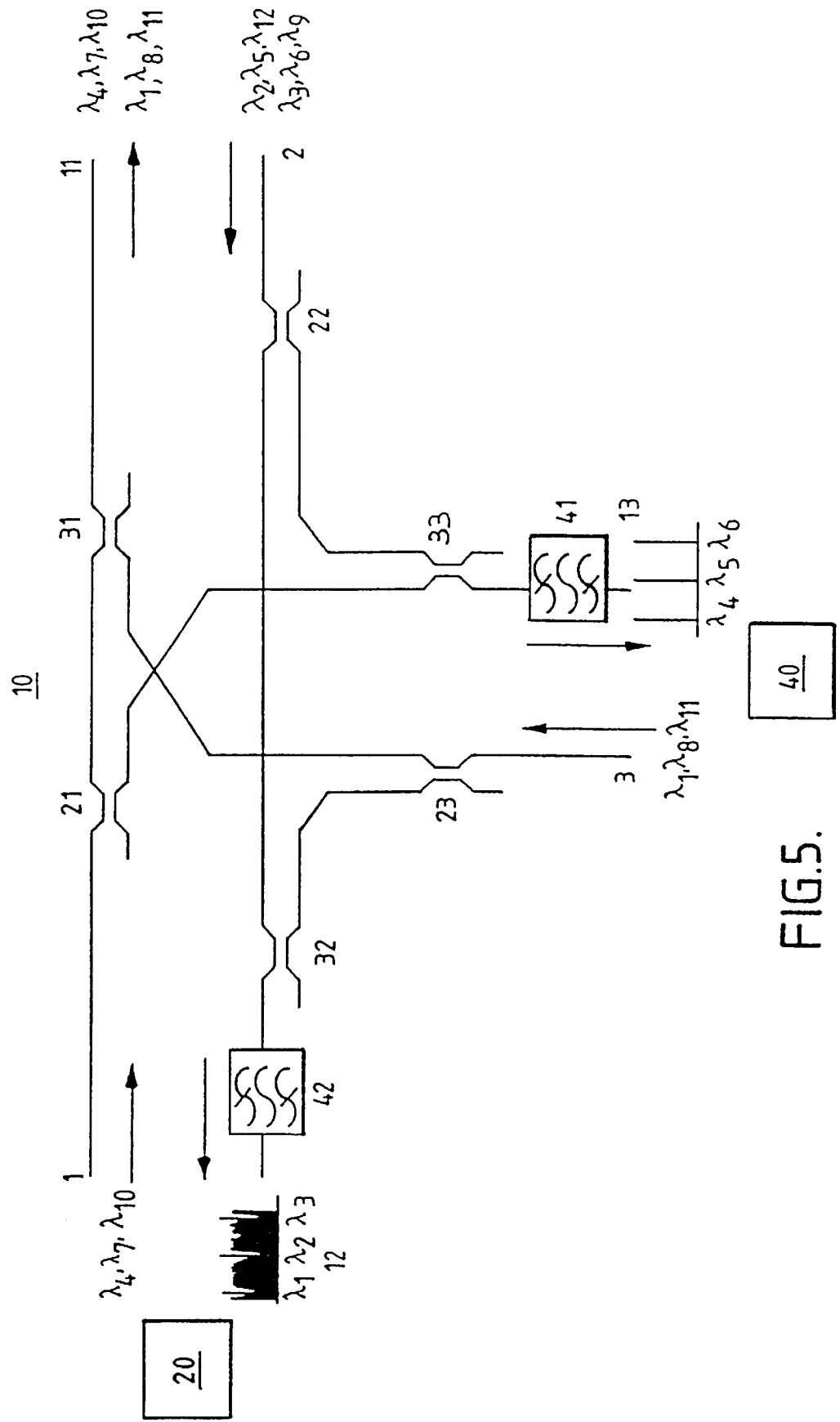
FIG. 5 shows an add/drop multiplexer according to a first embodiment of the invention.

The first embodiment of the invention, illustrated in FIG. 5, shows one way in which the transmission of signals to stations for which the signals are not intended can be prevented. Most system elements are as in FIG. 4, and are accordingly designated with the same reference numbers: the basic principles of operation are also the same. In FIG. 4, both branch output ports 13 and second output port 12 (as this is at the end of a main trunk) lead to branch stations. In the FIG. 4 arrangement, the main trunk extends from first output port 11 and second input port 2 to another ADM connected to two stations (one along a branch, the other at the end of a trunk), but the system is readily extensible to larger numbers of stations. In this four station system are thus three carrier wavelengths to be received and sent by each branch station, each for carrying communications from one of the other three stations. These wavelengths are selected such that the carrier wavelengths to be dropped to a given station are all grouped together in wavelength, so that there is a wavelength range which includes these carrier wavelengths but none of the other carrier wavelengths is use on the system. Bandpass filters 41, 42 are then provided before outputs leading to stations to allow only the carrier wavelengths for signals intended for receipt by that station to pass through. The branch drop fibre connected to branch output port 13 and the station drop fibre connected to second output port 12 therefore carry only signals intended for receipt by the relevant station.

This arrangement, although substantially secure, is inefficient in its use of wavelengths. It is desirable to keep the number of carrier wavelengths used to a minimum in order both to simplify the range of equipment required and to ensure that even in large systems there is an adequate wavelength spacing between carrier wavelengths.

Figure 7:
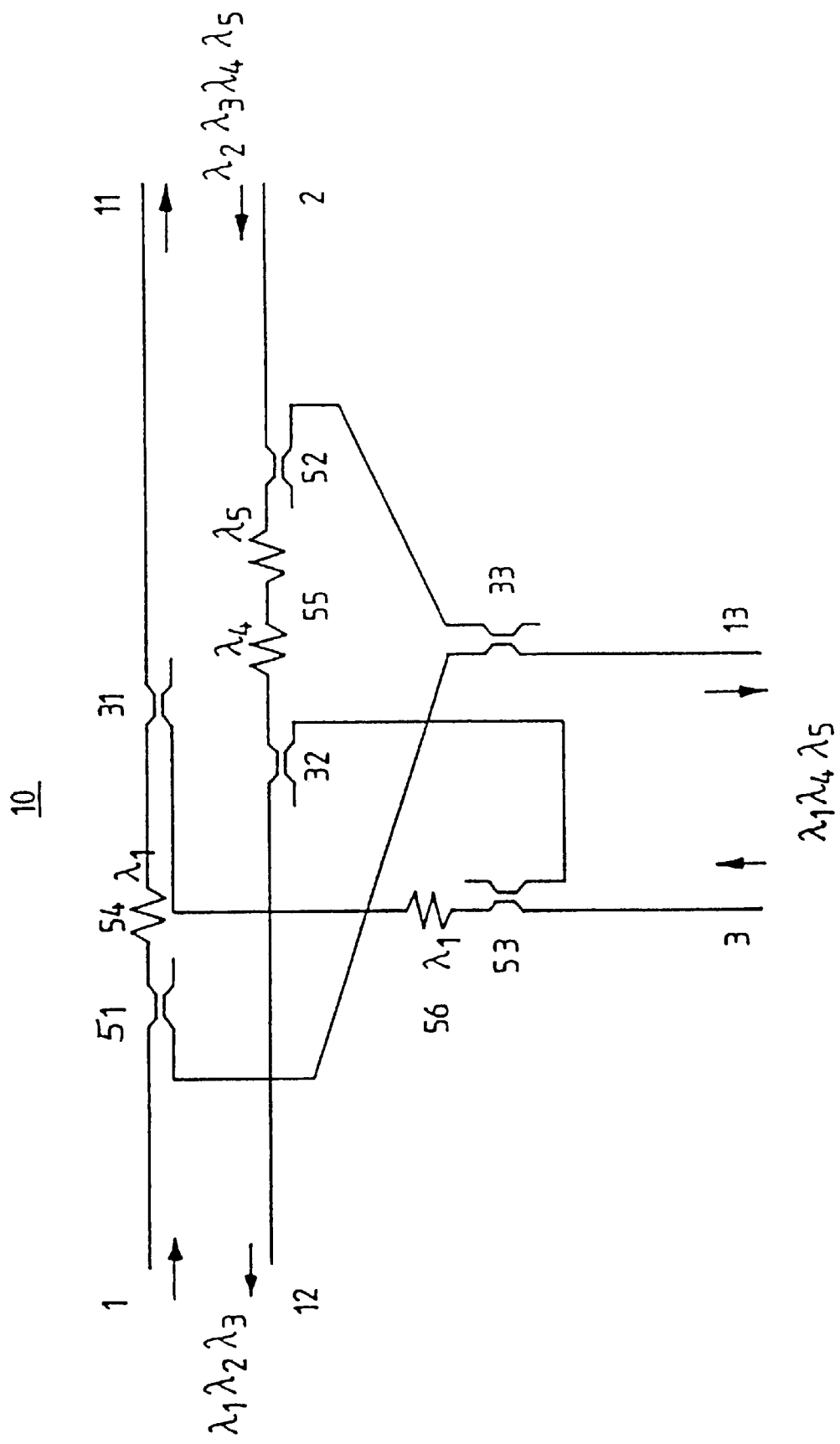
FIG. 7 shows an add/drop multiplexer according to a second embodiment of the invention.

The second embodiment of the invention is illustrated in FIG. 7 and enables a reduction of 50% in the number of wavelengths employed. This embodiment resembles the arrangement of FIG. 4 in several respects, and the same reference numbers are used to identify components common to both arrangements.

Figure 6:
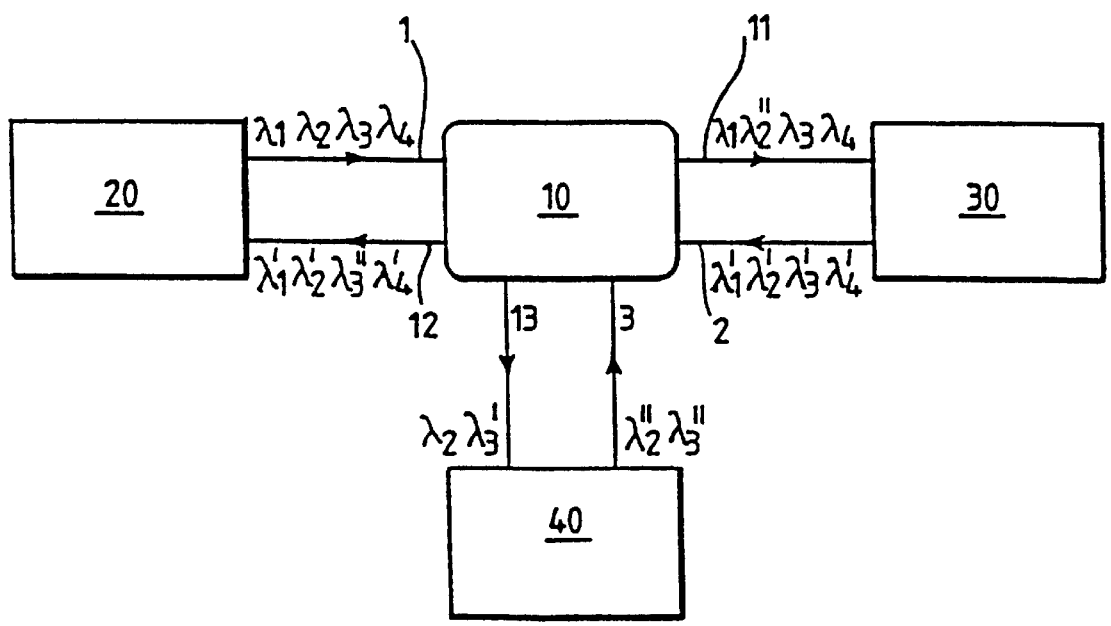
FIG. 6 shows a routing scheme for use in embodiments of the invention.

FIG. 6 illustrates a desirable configuration for a fibre optic network appropriate for use with the second and subsequent embodiments of the invention. The network has two main terminal stations 20,30 at opposite ends of a fibre trunk. The fibre trunk has two fibres carrying signals in opposite directions: fibre 1,11 carries signals from terminal station 20 towards terminal station 30 and fibre 2,12 carries signals from terminal station 30 towards terminal station 20. The network also has a third terminal station 40 located on a spur off the fibre trunk. Dropping of signals from the trunk fibres 1,2 to the spur station 40 and adding of signals from the spur station 40 to the trunk fibres 11,12 is achieved by an add/drop multiplexer 10 at a branching station. The system may readily be expanded by adding further branching stations each comprising an add/drop multiplexer on the fibre trunk to connect to a spur to a further spur station.

A significant distinction between the second embodiment of the invention and the FIG. 4 arrangement lies in the replacement of the signal splitting fibre optic couplers 21, 22, 23 with paired combinations of fibre optic couplers 51, 52, 53 and notch reflection filters 54, 55, 56.

The combination of fibre optic coupler and notch reflection filter is used to split the signal input through an input port into two components: one consisting only of carrier wavelengths for a first path, and the other consisting only of carrier wavelengths for a second path. Where the input port is one of the ports on the main trunk, this first path is for signals to continue along the trunk, and the second path for signals to be dropped at the branch. When the input port is from the branch, the first path is for signals to be transmitted in one direction along the trunk, and the second path is for signals to be transmitted in the opposite direction along the trunk.

For an example of how this is achieved, the coupler and filter pair of coupler 51 and notch reflection filter 54 is considered. Carrier wavelengths $\lambda_1, \lambda_2, \lambda_3$ are input through first input port I from a first station: $\lambda_1$ carries signals for transmission to the branch station, whereas $\lambda_2$ and $\lambda_3$ contain signals for transmission to stations further along the main trunk. First input port 1 is connected to a first side of fibre optic coupler 51. On the second side of fibre optic coupler 51 there is only one intermediate fibre, so the input signal is not split at this point but passes through the coupler to the intermediate fibre. On the intermediate fibre is the notch reflection filter 54 which reflects $\lambda_1$ but which passes $\lambda_2$ and $\lambda_3$. The $\lambda_2$ and $\lambda_3$ signals thus pass along the intermediate fibre towards coupler 31 and the first output port 11. The $\lambda_1$ carrier wavelength signal is however reflected towards the coupler 51. In addition to the fibre from the first input port 1, there is a second fibre connected to the first side of fibre optic coupler 51. This second fibre is an intermediate coupler leading to coupler 33 and hence to the branch output port 13. A signal at the $\lambda_1$ carrier wavelength after reflection at notch reflection filter 54 thus passes back through coupler 51 to coupler 33 through this intermediate fibre, and hence is dropped through branch output port 13.

An equivalent arrangement for each of the coupler/filter pairings shown in FIG. 7 can be devised. For example, in place of notch reflection filter 54 which reflects $\lambda_1$, two reflection filters could be used, one reflecting $\lambda_2$ and the other $\lambda_3$. The intermediate fibre with the notch reflection filter would then be connected to coupler 33, and the intermediate fibre connected to the first side of coupler 51 would be connected to coupler 31: the same division of signals would then be achieved. The arrangement shown in FIG. 7, in which signals along the trunk fibre are not reflected whereas signals for output along the branch fibre are reflected at some point, may however be advantageous in that it would minimize losses along the trunk fibre and ensure that no inappropriate signal reached the branch output port.

As indicated previously, the FIG. 7 arrangement allows for a 50% reduction in the number of wavelengths used. In this arrangement, the carrier wavelength for forward transmission between two stations is also used for return transmission, thus achieving the stated reduction.

Appropriate notch reflection filters can be provided in the form of bulk optical components. However, a preferred choice for a notch reflection filter is a fibre Bragg grating. The use of this component has been discussed above in relation to the prior art, and manufacture and optimisation of this component is discussed, inter alia, in Bennion et al, Electronics Letters 22(6):341–3, Dyer et al, Electronics Letters 30(14):1133–4, Malo et al, Electronics Letters 31(3): 223–5, and Albert et al, Electronics Letters 31(3):222–3.

An advantage of using fibre Bragg gratings is that this enables an all-fibre design for the ADM, with no need to pass any of the signals through a bulk optical component. These components are also not especially lossy—loss is typically in the region of 0.3 dB to 0.5 dB.

Although the components discussed above provide a particularly convenient form of filter for this purpose, it will readily be appreciated by the skilled man that alternative means to fibre Bragg gratings (or even to notch reflection filters) may be employed to reflect selected wavelengths and to allow other selected wavelengths to pass at appropriate points within the ADM.

In the FIG. 7 arrangement, losses will not be balanced on every channel if conventional 50:50 fibre optic couplers are used. It is however a straightforward matter to balance losses throughout the system if required: this can be done by appropriate (non-50:50) choice of fibre optic couplers and by insertion of suitable amplifiers into the system.

Figure 8:
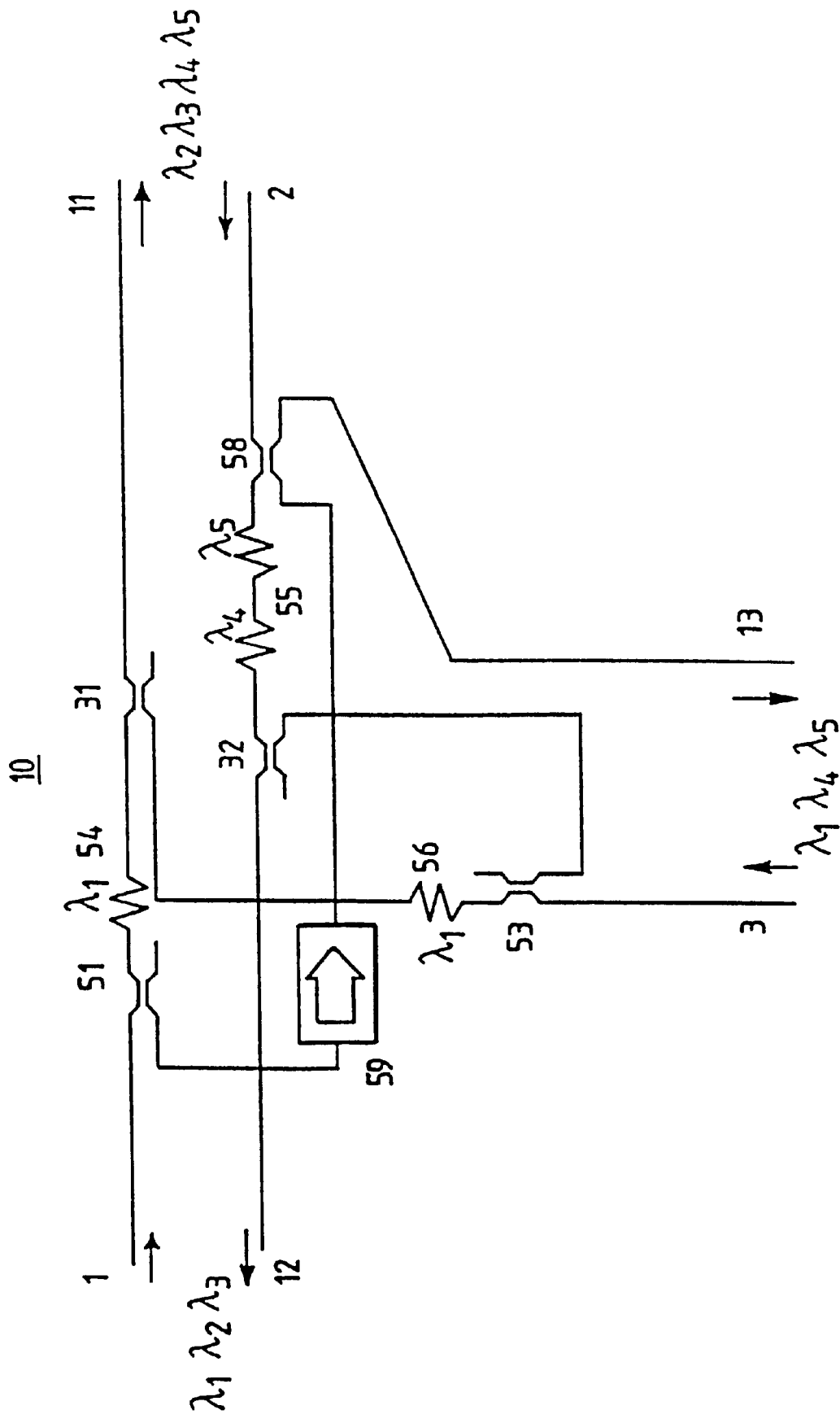
FIG. 8 shows an add/drop multiplexer according to a third embodiment of the invention.

The second embodiment of the invention as shown in FIG. 7 is relatively efficient in its use of carrier wavelengths, but the provision of fibre optic couplers to achieve the required splitting of signals results in high losses. FIG. 8 illustrates a third embodiment of the invention in which the introduction of a optical isolator allows for the removal of one of the fibre optic couplers and thereby significantly reduces the loss of certain carrier wavelengths ($\lambda_4$, $\lambda_5$ in the form of the embodiment illustrated).

The system of the third embodiment substantially resembles that of the second embodiment, and where the same components are used in both embodiments, the same reference numbers have been used in the figures. The distinction between the arrangement shown in FIG. 8 and that shown in FIG. 7 lies in the mechanism for combining the signals tapped from the trunk fibres for dropping at branch output port 13. The $\lambda_1$ signal is dropped from the combined signal input at first input port 1 by the combination of fibre optic coupler 51 and notch reflection filter 54 as previously. However, there is now included on the intermediate fibre conveying this tapped signal towards branch output port 13 an optical isolator 59. This component, which is commercially available from companies such as E-TEK Dynamics, Inc., of 1885 Lundy Avenue, San Jose, Calif. 95131 USA, allows transmission of light in one direction but not in the other. This intermediate fibre now leads not to a coupler 33, but rather to a fibre optic coupler 58 which replaces fibre optic coupler 52 of the FIG. 5 embodiment. Coupler 58 essentially resembles coupler 52, except in that on the second (notch reflection filter) side of the fibre optic coupler there is as well as the intermediate fibre to coupler 32, an input from the intermediate fibre leading from coupler 51 via isolator 59. On the first side of coupler 58, one of the fibres connected is from second input port 2 and the other leads to branch output port 13. This arrangement is effective for routing the required signals to branch output port 13 without introducing unwanted feedback signals into the system. The $\lambda_1$ signal originating at first input port 1 passes through fibre optic coupler 58 to branch output 13: any of this signal which is transmitted back out to second input port 2 will not cause difficulties. Of the signals input from second input port 2, it will be possible for these to pass down the intermediate fibre towards coupler 51: however, these signals will not be able to travel past the optical isolator 59. As the losses involved in the passage through the allowed direction of an optical isolator are significantly less than for passage through a fibre optic coupler, the losses for $\lambda_4$ and $\lambda_5$ carrier wavelengths are significantly lower than in the FIG. 7 arrangement. Again, it would be straightforward to produce an equivalent arrangement by instead modifying the FIG. 7 embodiment to provide an isolator on the intermediate fibre "carrying the" signal tapped for the branch output port 13 from optical coupler 52 and by modifying appropriately fibre optic coupler 51 by use of a 2:2 coupler. Again, the arrangement as shown is not loss balanced, but loss balancing is straightforward to achieve by appropriate component choice and by insertion of amplifiers where necessary.

Figure 9:
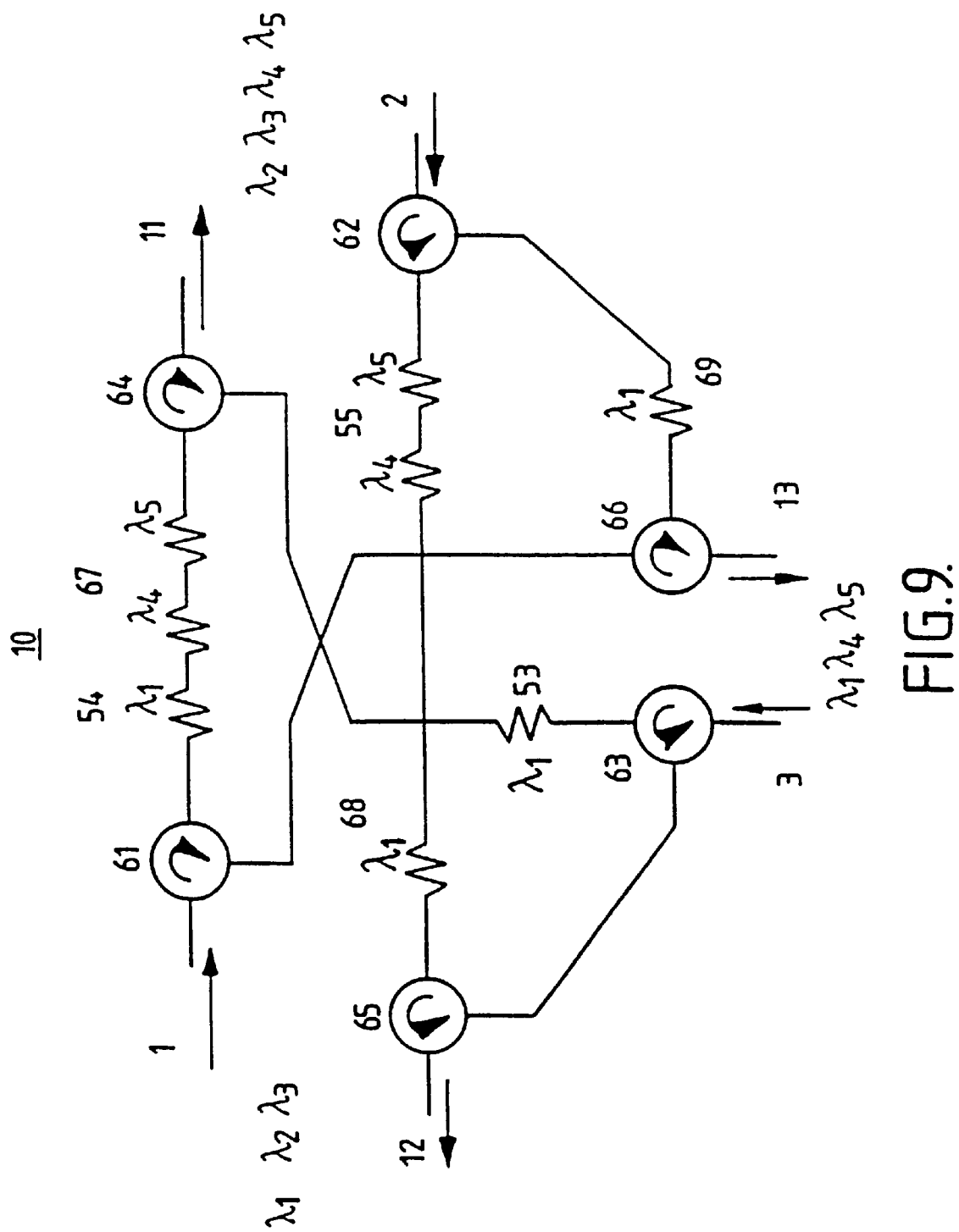
FIG. 9 shows an add/drop multiplexer according to a fourth embodiment of the invention.

The fourth embodiment of the invention is depicted in FIG. 9. This embodiment replaces all fibre optic couplers of previous embodiments with optical circulators. Optical circulators, which are referred to in certain of the prior art documents discussed earlier in the specification are components with at least three ports for which there is a high optical transmissivity for signals entering one port for output from the next port in sequence, with a very high degree of isolation for the same path in the reverse direction. Optical circulators can also be obtained from E-TEK Dynamics, Inc, at the aforementioned address. Circulators are significantly less lossy than fibre optic couplers, the loss concerned being of the order of 1 dB as compared to 3 dB for a fibre optic coupler. In the arrangement depicted in FIG. 9 as compared to that of FIG. 7, each of the fibre optic couplers 51, 52, 53 for splitting the input signals has been replaced by a three port optical isolator and each of the fibre optic couplers 31, 32, 33 for combining the appropriate pair of split input signals has been replaced by the combination of a three port optical circulator and a notch reflection filter. The replacement of fibre optic couplers 31, 32, 33 by three port optical circulators 61, 62 and 63 is relatively straightforward. For example, for optical circulator 61, the input signal arrives in the same manner as previously from first input port 1. Substantially the whole signal passes out through the subsequent port of the optical circulator on to an intermediate fibre, and as before the $\lambda_1$ carrier wavelength is reflected by notch reflection filter 54 while the remaining wavelengths pass on in the direction of the first output port 11. The reflected $\lambda_1$ component returns to the second port of the optical circulator 61 and passes substantially entirely out through the third port for routing towards branch output port 13. The replacement of the couplers 31, 32 and 33 for combining the relevant pair of split signals is slightly more complex. For example, the replacement of fibre optic coupler 31 by three port optical circulator 64 and notch reflection filter 67 is considered. Two signals are to be combined, one carrying $\lambda_4$ and $\lambda_5$ carrier wavelengths from branch input port 3, and one carrying carrier wavelengths $\lambda_2$ and $\lambda_3$ from first input port 1. The signal from branch input port 3 appears along the relevant intermediate fibre from three port optical circulator 63 through notch reflection filter 53. At optical circulator 64, this signal is transmitted substantially wholly out through the next port of the circulator along an intermediate fibre towards optical circulator 61. However, notch reflection filter 67 is provided to reflect both carrier wavelengths $\lambda_4$ and $\lambda_5$ originating from branch input port 3. This signal from branch input port 3 is therefore reflected back towards the circulator 64, where it passes out through the subsequent circulator port to first output port 11. The signal from first input port 1 which has passed through notch reflection filter 54 comprises carrier wavelengths $\lambda_2$ and $\lambda_3$. This signal therefore also passes through notch reflection filter 67, and accompanies the signal from branch input port 3 through the circulator 64 and out through first output port 11. As this design employs only notch reflection filters and optical circulators, it has a low loss for all carrier wavelengths.

Figure 10:
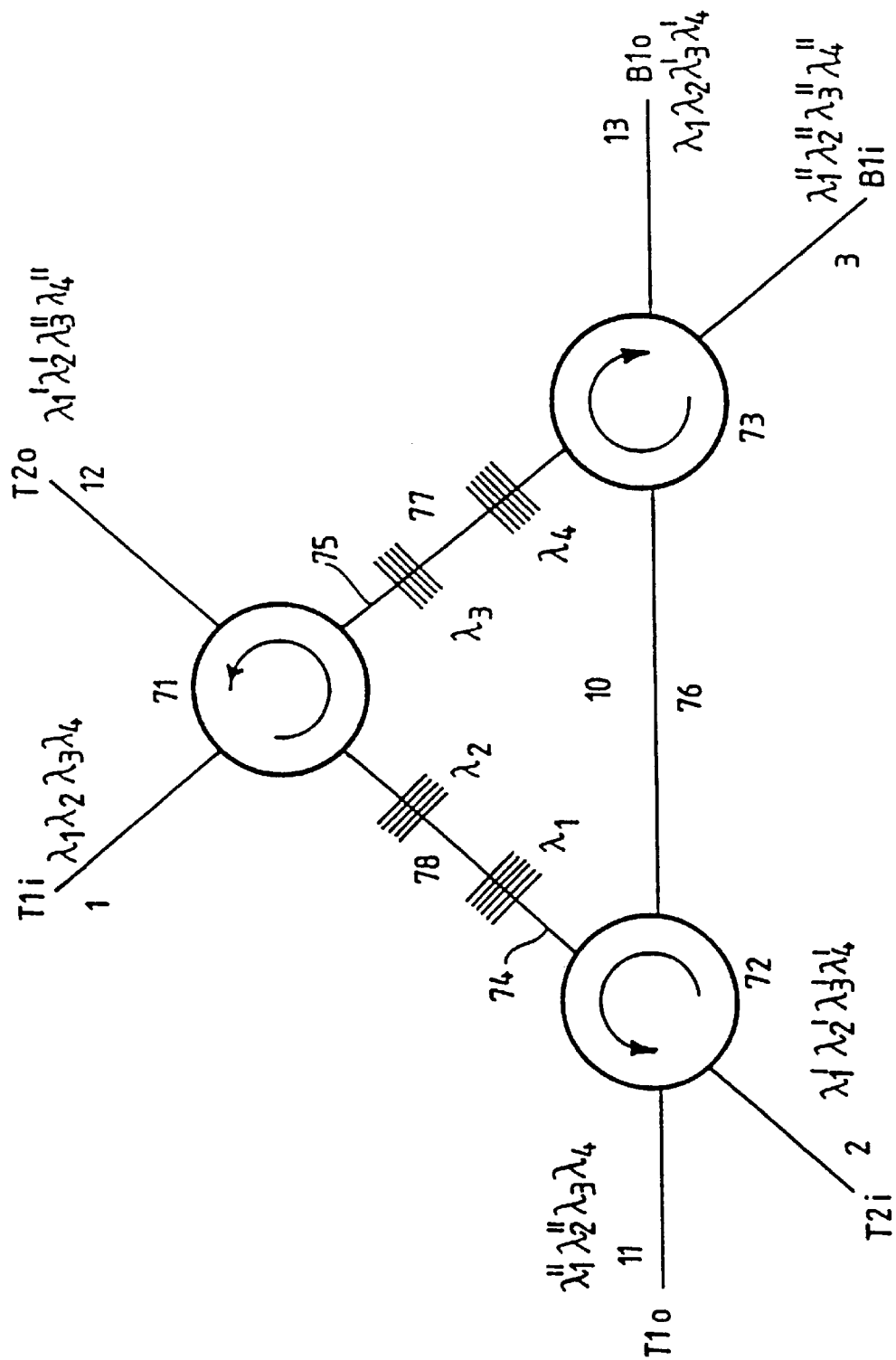
FIG. 10 shows an add/drop multiplexer according to a fifth embodiment of the invention.

The fifth embodiment of the invention is illustrated in FIG. 10. In the FIG. 10 embodiment, as in previous embodiments, there is a first input port 1 and a first output port 11 for the first fibre of the trunk, a second input port 2 and a second output port 12 for the second fibre of the trunk, and also a branch input port 3 and a branch output port 13 for adding and dropping signals from the branch. This design however employs four port circulators. These circulators, also obtainable from E-TEK Dynamics, Inc., are similar to the three port circulators previously described in that the signal input to one port is then substantially wholly output through the next port in sequence. The system illustrated employs three such four port circulators 71, 72, 73. For each circulator, one port is connected to one of the three input ports, another port is connected to one of the three output ports, and the other two ports are each connected by an intermediate fibre to a different one of the other two circulators. The sequence order of ports at each circulator is: input port, connection to first one of other circulators, connection to second one of other circulators, output port. The splitting of signals from a given input port so that components at different carrier wavelengths are routed to appropriate output ports is achieved by a combination of circulators as described together with notch reflection filters 74, 75 on the intermediate fibres. This combination of notch reflection filters 74, 75 and circulators 71, 72, 73 is also effective to couple the different sets of carrier wavelengths intended for transmission through appropriate ones of the output ports 11, 12, 13.

For the network shown in FIG. 10, wavelength reuse is achieved not by having the same carrier wavelengths for forward and return communication between a given pair of stations as in the second to fourth embodiments, but rather by dropping a particular carrier wavelength from the trunk to the branch and then adding a new signal at the same carrier wavelength for onward transmission along the same trunk fibre. Such an arrangement is more appropriate for use in sending signals to and receiving signals from spur stations: the arrangement for wavelength reuse in earlier embodiments is more appropriate for communication between stations on the main trunk. For example, in the FIG. 10 embodiment a signal having carrier wavelengths signals $\lambda_1, \lambda_2, \lambda_3, \lambda_4$ is admitted to first input port 1. This signal is circulated in full to intermediate branch 74, where the $\lambda_1$ and $\lambda_2$ components are reflected by notch reflection filter 78. The $\lambda_3$ and $\lambda_4$ components however continue to optical circulator 72 and are circulated for transmission out through first output port 11. The $\lambda_1$ and $\lambda_2$ components are however reflected back to circulator 71 and circulated onwards through to intermediate fibre 75, where they pass through notch reflection filters 77 to circulator 73. At circulator 73, the $\lambda_1$ and $\lambda_2$ signals are circulated to branch output port 13 for dropping on the branch output fibre. Similarly, signals $\lambda_1', \lambda_2', \lambda_3', \lambda_4'$ are travelling in the opposite direction along the other trunk fibre and are admitted to the system through second input port 2. The $\lambda_1'$ and $\lambda_2'$ components are circulated through circulators 72, 73 and 71 in turn and exit through second output port 12. However, the $\lambda_3'$ and $\lambda_4'$ signals, after passing through circulators 72 and 73, are reflected by notch reflection filter 77 and return along intermediate fibre 75 to circulator 73, where they are then circulated to the output branch port 13. In this arrangement, the signals for onward transmission along the same fibre (that is, to pass into first input port and out through the first output port, or to pass in through the second input port and out through the second output port) are simply circulated by the system and pass without reflection through any of the notch reflection filters on the intermediate fibres on which they travel, whereas the signals to be dropped through branch output port 13 are all reflected by one of the notch reflection filters 77, 78. This arrangement serves to ensure that only signals which are designated for reception at the branch station are output through branch output port 13. Signals $\lambda_1'', \lambda_2'', \lambda_3''$ and $\lambda_4''$ are admitted through branch input port 3. These signals pass through optical circulator 73 onto intermediate fibre 76, and are then circulated onto intermediate fibre 74 by optical circulator 72. At this point the signal is split. $\lambda_1''$ and $\lambda_2''$ are reflected by notch reflection filter 78 and are circulated by circulator 72 out through the first output port 11, $\lambda_1''$ and $\lambda_2''$ thus replacing $\lambda_1$ and $\lambda_2$ on the first of the to fibres. $\lambda_3''$ and $\lambda_4''$ however pass through notch reflection filters 78 and are circulated by optical circulator 71 onto intermediate fibre 75. These signals are then reflected by notch reflection filters 77 back to optical circulator 71 and are circulated out to second output port 12. $\lambda_3''$ and $\lambda_4''$ therefore replace $\lambda_3'$ and $\lambda_4'$ on the second of the trunk fibres.

The arrangement of FIG. 10 can be readily scaled to allow one or more further branches to be connected to the same branching point. Additional branches can also receive dropped signals from the two trunk fibres and to replace these dropped signals with added signals at the same carrier wavelength. The general arrangement for such an add/drop multiplexer, with a second branch input port 4 and a second branch output port 14, is shown in FIG. 11.

Figure 11:
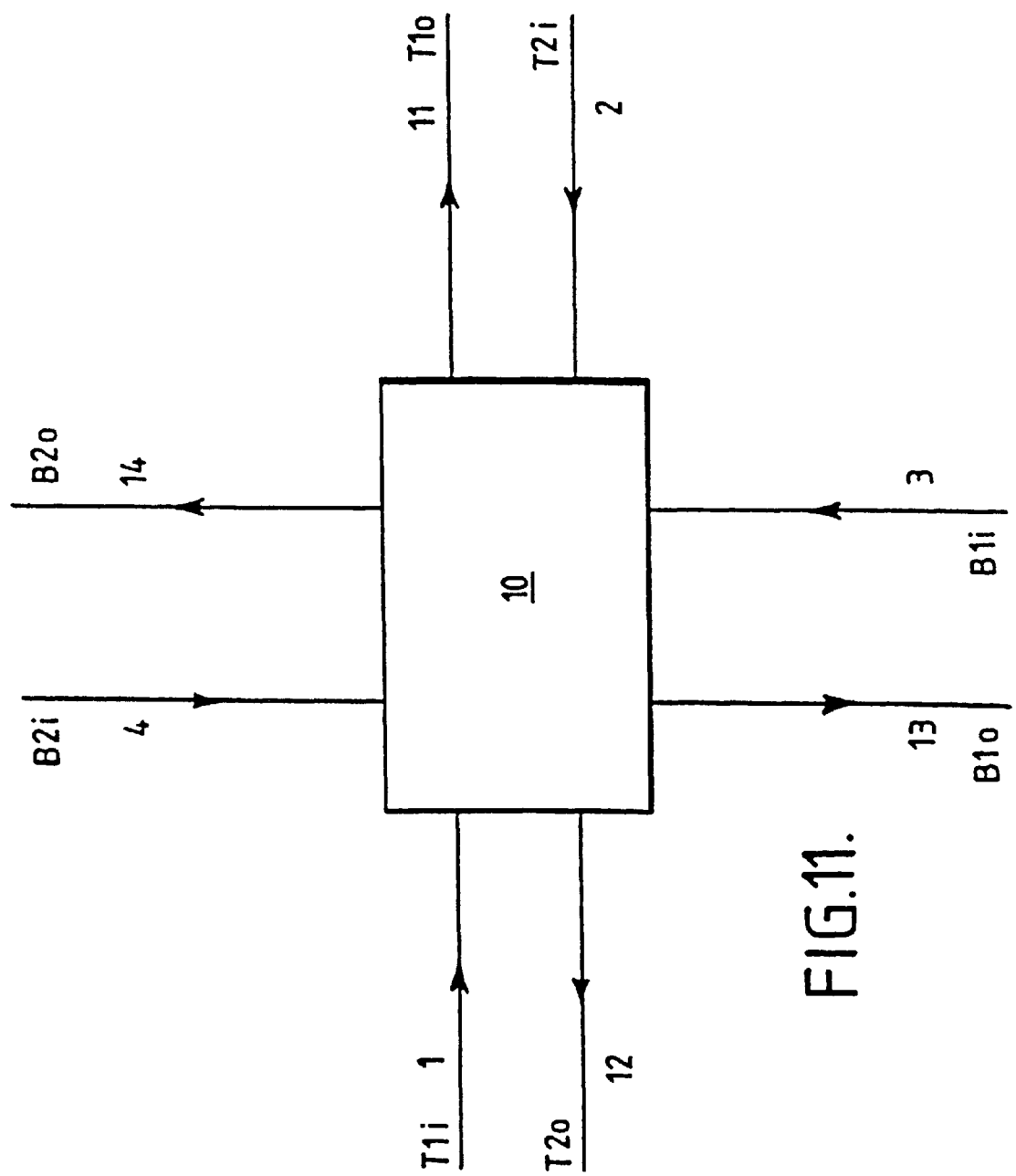
FIG. 11 shows a routing scheme for use in a sixth embodiment of the invention.
Figure 12:
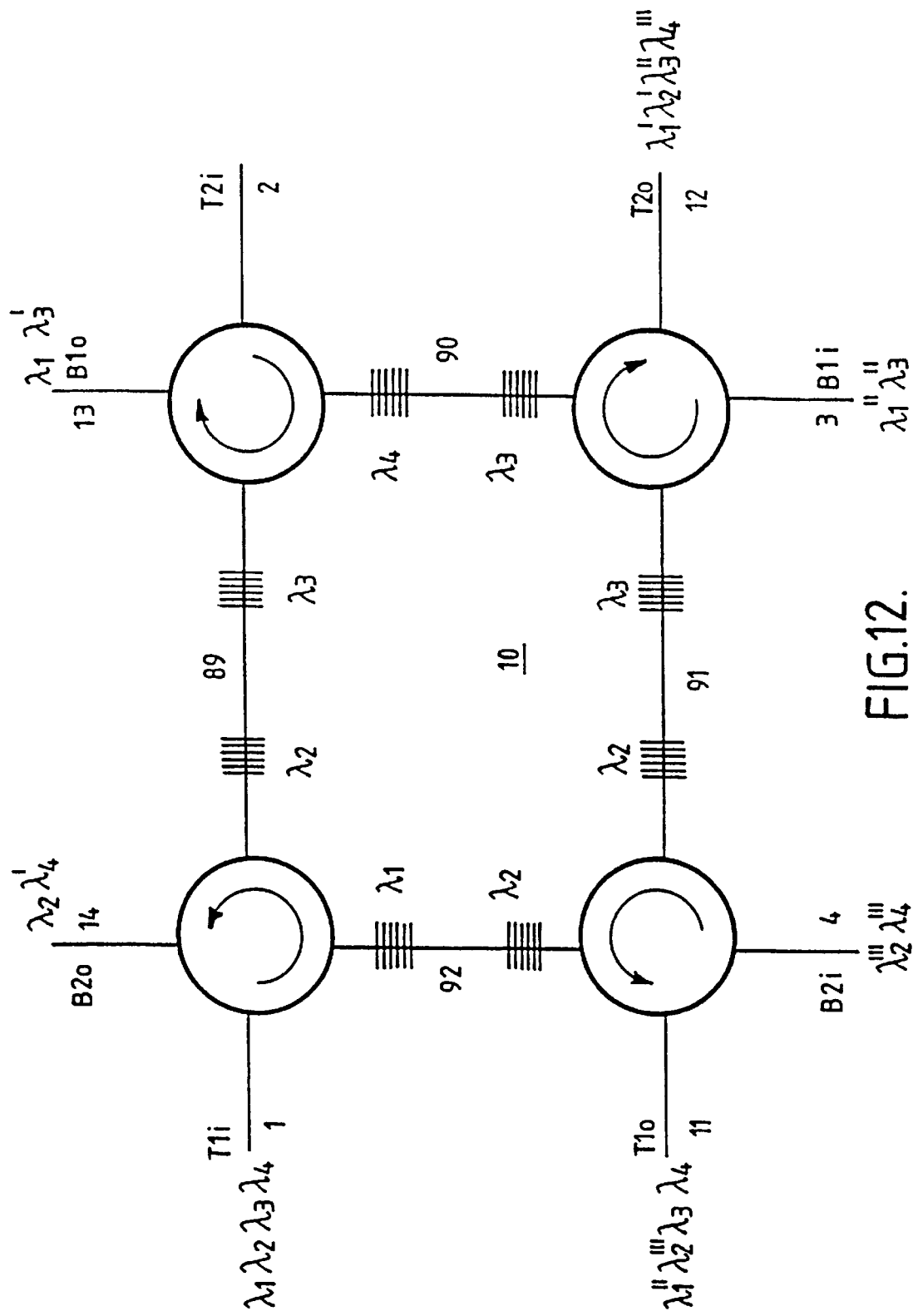
FIG. 12 shows an add/drop multiplexer according to a sixth embodiment of the invention.

An add/drop multiplexer according to a sixth embodiment of the invention is illustrated in FIG. 12 and provides the branching arrangement shown in FIG. 11. Table 1 below illustrates the carrier wavelengths input and output at each of these ports.

TABLE 1

Routing table for a 2 spur branching unit

| Port | Description | Wavelengths In | Wavelengths Out |
|------|-------------|----------------|-----------------|
| T1i | Trunk fibre 1 (in) | $\lambda_1,\lambda_2,\lambda_3,\lambda_4$ | — |
| T1o | Trunk fibre 1 (out) | — | $\lambda_1'',\lambda_2''',\lambda_3,\lambda_4$ |
| T2i | Trunk fibre 2 (in) | $\lambda_1',\lambda_2',\lambda_3',\lambda_4'$ | — |
| T2o | Trunk fibre 2 (out) | — | $\lambda_1',\lambda_2',\lambda_3'',\xi_4'''$ |
| B1i | Branch fibre 1 (in) | $\lambda_1'',\lambda_3''$ | — |
| B1o | Branch fibre 1 (out) | — | $\lambda_1,\lambda_3'$ |
| B2i | Branch fibre 2 (in) | $\lambda_2''',\lambda_4'''$ | — |
| B2o | Branch fibre 2 (out) | — | $\lambda_2,\lambda_4'$ |

The path for each carrier wavelength can be traced through the system employing the principles indicated with respect to the FIG. 10 embodiment. This arrangement, which is expandable by addition of further four port optical circulators and appropriate notch reflection filters to allow further branches to be connected, has significant common features with the FIG. 10 embodiment. For every circulator, the port sequence is input port, intermediate fibre connected to one of the other circulators, intermediate fibre connected to another one of the other circulators, output port. The circulators and intermediate fibres form a ring arrangement. Signals for onward transmission along a given trunk fibre are circulated without a reflection at any of the notch reflection filters, whereas signals to be dropped at one or other of the branch output ports 13, 14 are reflected at one or more notch reflection filters 89, 90, 91, 92. Notch reflection filters 89, 90, 91, 92 have the function both of splitting signals input from a given input port and of combining signals from different input ports for transmission through a common output port.

In the embodiment shown in FIG. 12, the branches only exchange signals with the two trunk fibres. It is however quite possible with appropriate choices of filters and wavelengths for signals to pass between branches as well.

An advantageous feature of all of the embodiments described is that all the optical components employed are passive. None requires there to be any form of active control of the system, as the add drop multiplexers concerned simply route particular carrier wavelengths input through particular input ports through appropriate output ports according to a predetermined scheme in accordance with the characteristics of the components concerned. This is particularly advantageous in the field of submarine cables, where it is extremely difficult and time consuming to change or repair a component on a laid cable, as the cable is typically on the sea bottom and many miles offshore. For this reason it is also desirable for components for use in this field to be "qualified". In this context this has the meaning that the components used are warranted to remain stable over 25 years of use.

Figure 13:
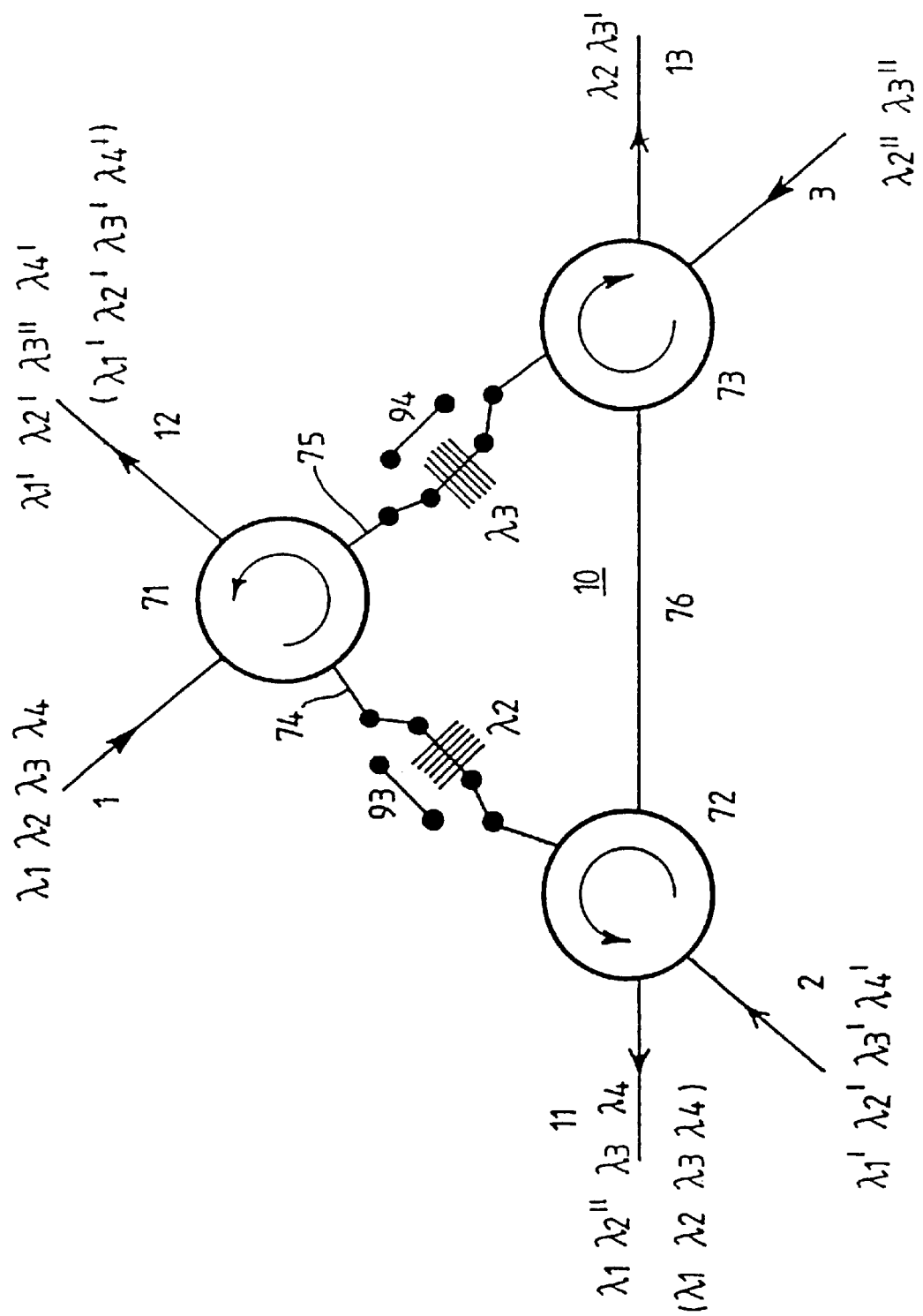
FIG. 13 shows an add/drop multiplexer according to a seventh embodiment of the invention.

However, one practical possibility after development of systems such as those illustrated above is in switching certain of the notch reflection filters to change the routing within an add/drop multiplexer. This allows more general modular components to be produced for configuration within a network, and also for the routing within a given system to be changed easily. The optical system resulting is still passive, in that all the optical components involved are passive. However, the switching of components, preferably remote switching of individual or groups of notch reflection filters, enables units to be produced to a more general modular design. One illustration of such switching, which could be applied to any of the embodiments described above employing notch reflection filters, is shown in FIG. 13 illustrating a seventh embodiment of the invention. In this embodiment, a signal comprising $\lambda_1$, $\lambda_2$, $\lambda_3$, $\lambda_4$ is admitted through first input port 1 and signal $\lambda_1'$, $\lambda_2'$, $\lambda_3'$, $\lambda_4'$ is admitted through second input port 2. Signals $\lambda_2''$, $\lambda_3''$ are admitted to the system through branch input port 3. With switchable gratings 93, 94 in the positions as shown, signal $\lambda_2$ is dropped through branch output port 13 and replaced by $\lambda_2''$ in the signal emitted through first output port 11. Likewise, $\lambda_3'$ is dropped from the second fibre signal through branch output port 13 and is replaced by $\lambda_3''$ from branch input port 3 in the signal emitted through second output port 12. However, if the switchable notch reflection filters 93, 94 are switched to the alternative position shown, in which there is no notch reflection filter on either intermediate fibre 74 or intermediate fibre 75, the result is different. The entire signal from first input port 1 passes along the first fibre along through the first output port 11 and the entire signal from second input port 2 continues along the second fibre through second output port 12. Signals $\lambda_2''$ and $\lambda_3''$ from the branch input port pass through each circulator in turn before being sent back out through branch output port 13. As indicated previously, a different routing can be achieved by use of a different switching arrangement.

Figure 2:
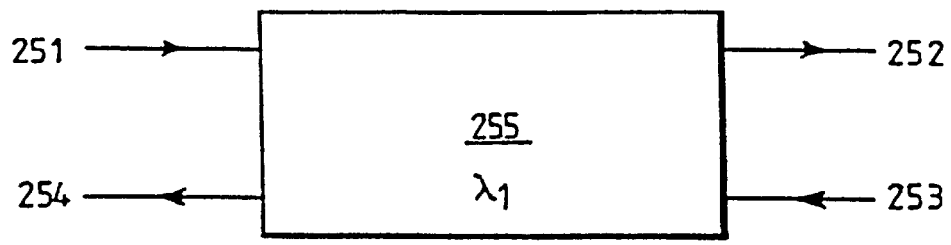
FIG. 2 shows a schematic diagram of the inputs and outputs of a Mach-Zehnder interferometer multiplexer unit.

In the network shown in FIG. 6, only one fibre 3 is provided to add signals from the spur station 40 to the trunk fibres 11,12 and only one fibre 13 is provided to drop signals from the trunk fibres 1,2 to the spur station 40. This configuration is not achievable by, say, using one Mach-Zehnder add/drop multiplexer with the functionality illustrated in FIG. 2 on each trunk fibre 1,2. This would lead to use of one add fibre and one drop fibre for each trunk fibre—in this case, four fibres would be required for communication between the spur station 40 and the fibre trunk. If, as is possible, additional trunk fibres are provided, still more spur fibres would be required.

Figure 14:
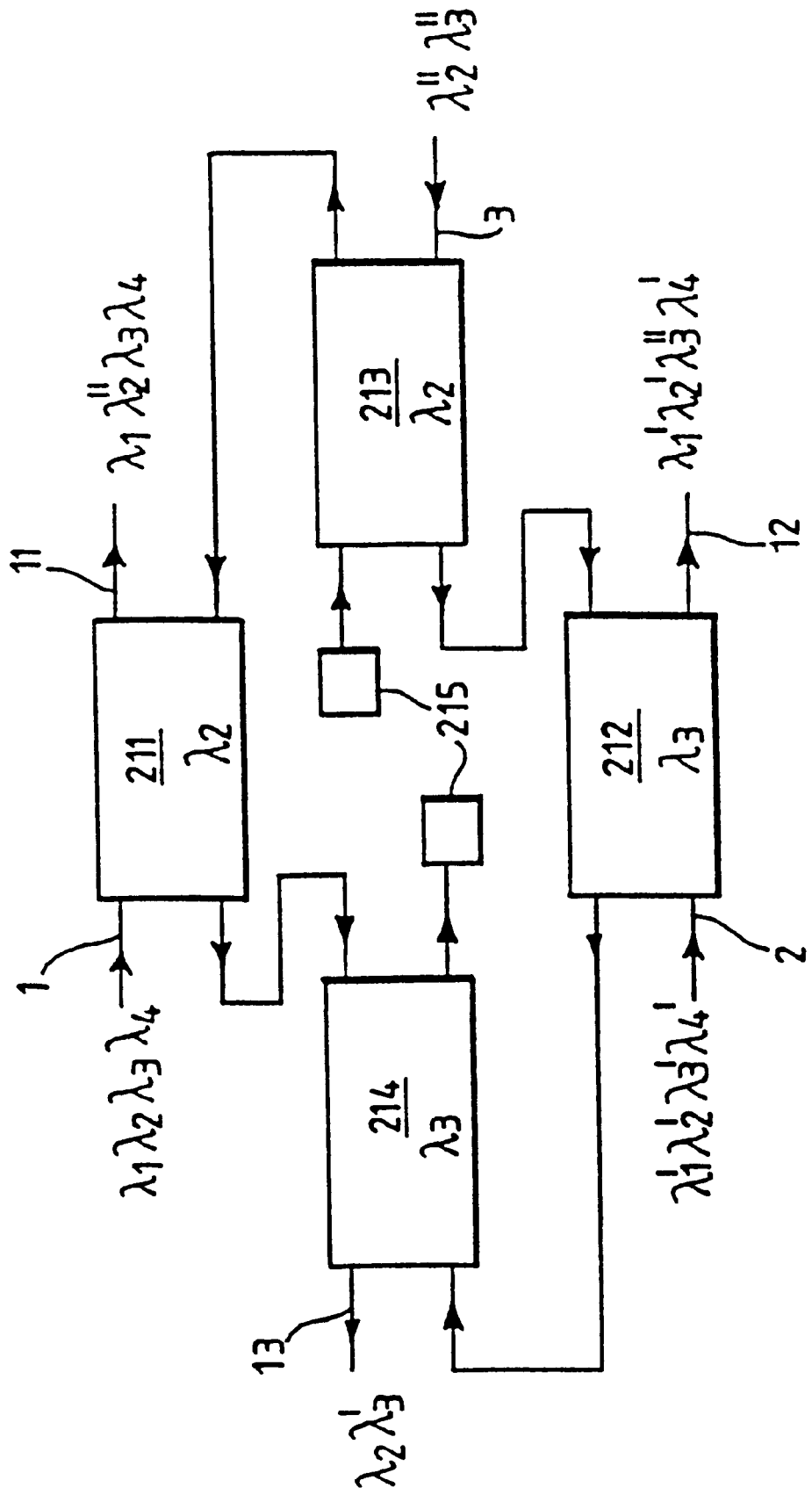
FIG. 14 shows and add/drop multiplexer comprising a ring configuration of basic multiplexer units.

A fibre optic network as illustrated in FIG. 6 is achievable with an add/drop multiplexer as shown in FIG. 14. This add/drop multiplexer 1 comprises a plurality of interconnected basic multiplexer units 211,212,213,214. Each of these basic multiplexer units has the functionality of the Mach-Zehnder add/drop multiplexer discussed above with relation to FIG. 2—that is, there is a first input and a first output, and a second input and a second output, and routing means are provided such that signals pass from first input to first output and from second input to second output, except at certain predetermined carrier wavelengths, at which signals are routed from first input to second output and from second input to first output.

In this case the plurality of interconnected basic multiplexer units 211,212,213,214 comprises a ring network. For one basic multiplexer unit 211, the first input and first output are for the first trunk fibre 1,11. Similarly, for another basic multiplexer unit 212, the first input and first output are for the second trunk fibre 212. The second outputs of each of these basic multiplexer units 211,212 lead to the first and second input, respectively, of a third basic multiplexer unit 214. For this third basic multiplexer unit 214, one of the two outputs is connected to a drop fibre 13 to drop signals to the spur station. The other output is connected to an antireflection termination 215 to eliminate the possibility of signals passing on to unintended routes. In similar fashion, the second inputs of each of the first two basic multiplexer units 211,212 are connected to the first and second output, respectively, of a fourth basic multiplexer unit 213. For this fourth basic multiplexer unit 213, one of the two inputs is connected to an add fibre 3 so that signals can be added from the spur station 40, and the other of the two inputs is connected to an anti-reflection termination 215.

This arrangement provides the routing indicated in FIG. 6. For example, consider signals at $\lambda_2$. Signals at this carrier wavelength are dropped from trunk fibre 1 to spur station 40 at the add/drop multiplexer 10 and replaced on trunk fibre 11 by new signals from the spur station 40 at the same carrier wavelength. However, signals at this carrier wavelength on the other trunk fibre 2 are to pass through add/drop multiplexer 10 and remain on the trunk fibre. The signals at this carrier wavelength entering the add/drop multiplexer from each of the trunk fibres 1,2 and from the add fibre 3 are considered below.

The signal entering on fibre 1, termed $\lambda_2$, enters the add/drop multiplexer at the first input of basic multiplexer unit 211. Basic multiplexer unit 211 has notch reflection filters for this wavelength, and is thus adapted to switch signals at this carrier wavelength from the normal path (first input to first output, second input to second output) so that signals are routed to the other output. Accordingly, the $\lambda_2$ signal is routed to the second output of basic multiplexer unit 211 and hence to the first input of basic multiplexer unit 214, rather than to the first output of basic multiplexer unit 211 and out back on to trunk fibre 11, as is the case for the remainder of the signals input on trunk fibre 1. Basic multiplexer unit 214 has no notch reflection filters for the $\lambda_2$ carrier wavelength, and so allows signals at this carrier wavelength to pass through it along the normal path, so the signal passes out through the first output of this basic multiplexer unit and on to branch output fibre 13, from which the signal passes to the spur station 40.

By contrast, the signal on fibre 2 at the same carrier wavelength, termed $\lambda_2'$, enters add/drop multiplexer 10 at the second input of basic multiplexer unit 212. This basic multiplexer unit allows signals at this carrier wavelength to continue along their normal path, so the $\lambda_2'$ signal merely passes out of the second output of basic multiplexer unit 212 and back on to trunk fibre 12.

The signal from the spur station 40 at this carrier wavelength, termed $\lambda_2''$, enters the add/drop multiplexer 10 at the second input of basic multiplexer unit 213. This basic multiplexer unit does reroute signals at this carrier wavelength away from the normal path, so the $\lambda_2''$ signal passes out through the first output to the second input of basic multiplexer unit 211. This basic multiplexer unit also reroutes signals at this carrier wavelength, so the signal passes to the first output of basic multiplexer unit 211 and exits on trunk fibre 11—the $\lambda_2''$ signal has thus replaced the $\lambda_2$ signal on the first trunk fibre 11.

A similar analysis can be followed for signals at $\lambda_3$. This can be seen to have the results indicated both in FIG. 6 and FIG. 14. Different routing arrangements employing the same basic principles, possibly involving expanded ring networks so signals can be routed for additional spur stations or branch fibres, would be available to the skilled man: this aspect of the invention is not limited simply to an arrangement with the routing indicated for FIG. 6.

An advantage of add/drop multiplexers in accordance with this aspect of the invention is that they can be constructed to be very low in loss. This is especially true if Mach-Zehnder add/drop multiplexers are used—these have losses which are typically between 0.5 dB and 1 dB for each path. There is the further advantage that the losses in such a device are symmetrical. If Mach-Zehnder add/drop multiplexers are employed as basic multiplexer units, the loss in the add/drop multiplexer will typically be of the order of 1 dB in the trunk fibres and 2 dB in the add to the trunk and in the drop from the trunk. This is attractive in system terms, as the additional loss in the spur can be accommodated simply by making the distance along the spur section from the add/drop multiplexer 1 to the first spur repeater slightly shorter. The symmetry of the system results in symmetry in the losses for equivalent paths through the add/drop multiplexer, which is generally attractive in system design.

There are further advantages in using Mach-Zehnder add/drop multiplexers as the basic multiplexer units. The add/drop multiplexer 1 may then be formed as an all-fibre device, containing no active components (not even the magnets and Faraday rotators used in optical isolators and optical circulators). Assembly is also very simple—only four fibre splices are required. The design is as a whole extremely compact, and offers the potential of a very high level of reliability as it is both simple and passive. However, it is quite possible to produce a device in accordance with this aspect of the invention by using basic multiplexer units of the same functionality but with a different construction and with different optical components—this is discussed further below.

Figure 15:
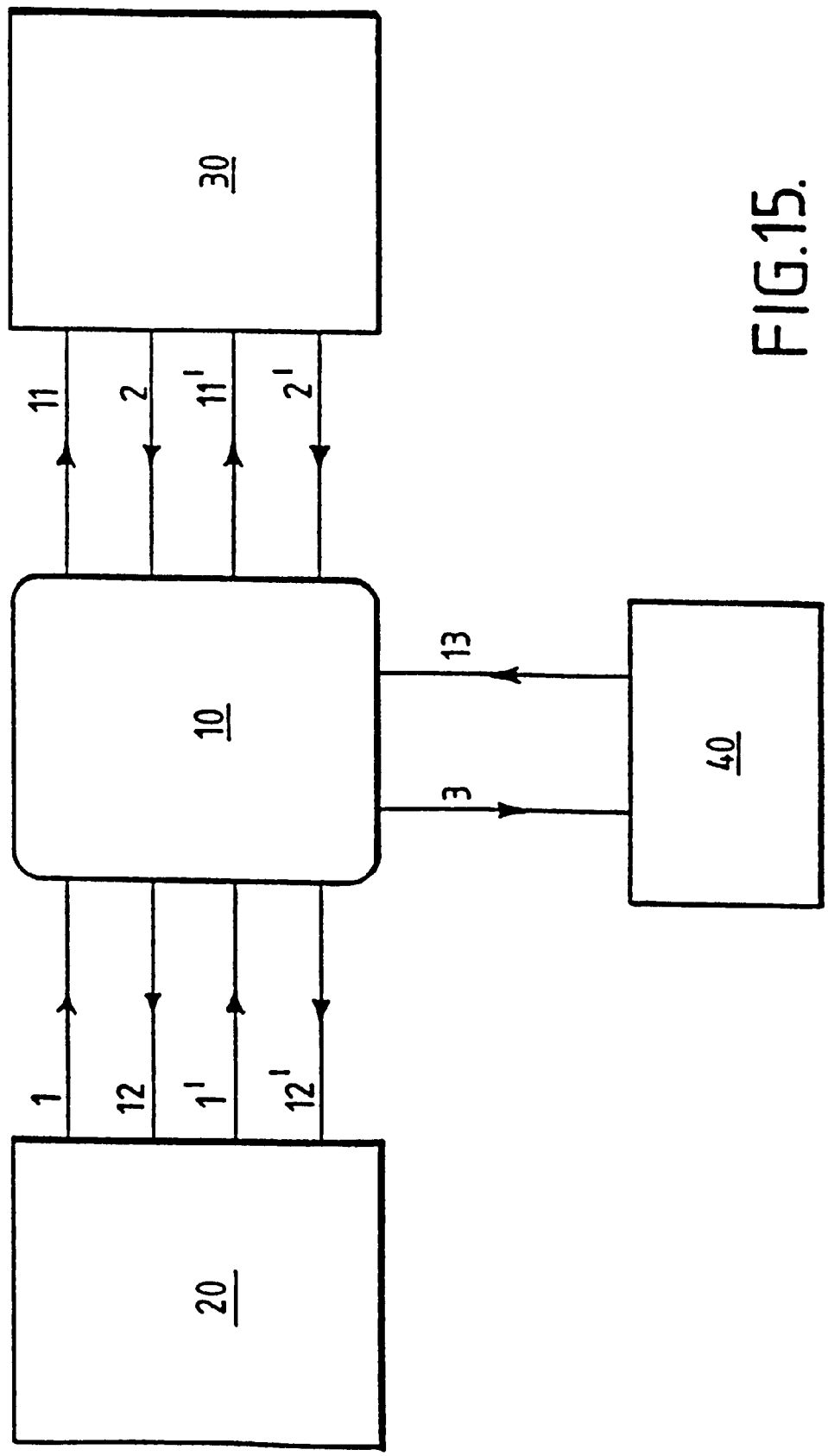
FIG. 15 shows a further routing scheme to which an add/drop multiplexer is adapted.

FIG. 15 shows a further network configuration to which an add/drop multiplexer is adapted. In this network configuration, there is a third trunk fibre 1',11' carrying signals in the same direction as trunk fibre 1,11 and a fourth trunk fibre 2',12' carrying signals in the same direction as trunk fibre 2,12. Such an arrangement is appropriate if there are a large number of stations on the network: in such a case, carrying signals on a single trunk fibre in each direction may prove unacceptably slow or use wavelengths so inefficiently that satisfactory network performance cannot be achieved.

Figure 16:
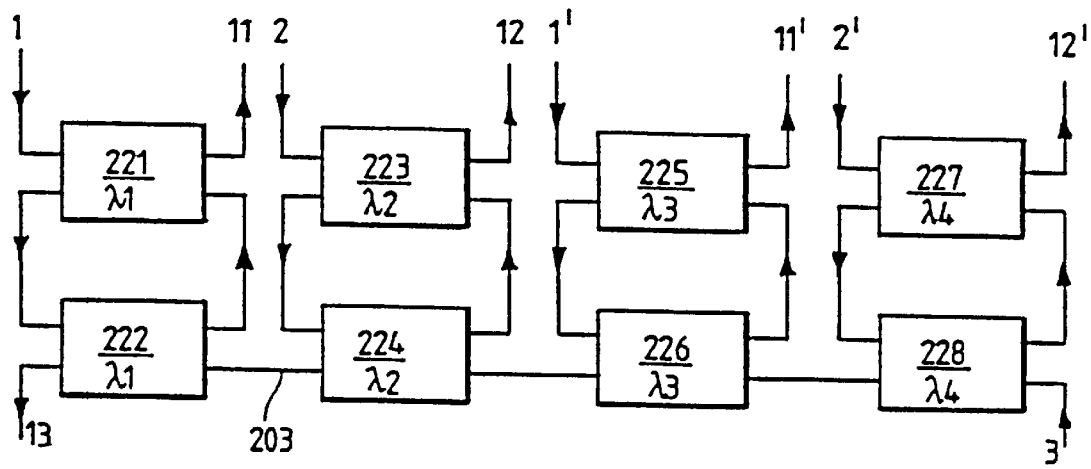
FIG. 16 shows a linear configuration of basic multiplexer units.

An add/drop multiplexer particularly adapted for use in a network configuration as shown in FIG. 15 is illustrated in FIG. 16. In this case, the plurality of interconnected basic multiplexer units comprise a linear network of matched pairs 221,222; 223,224; 225,226; and 227,228, of basic multiplexer units. Each basic multiplexer unit of a pair has the same wavelength or wavelengths for rerouting from the normal path—in the case of pair 221,222, this is $\lambda_1$. The first input and output of the first basic multiplexer unit 221 of the pair are connected to input fibres and output fibres for a given trunk fibre—in this case, trunk fibre 1,11. Consequently, the only signals rerouted away from trunk fibre 1,11 are at the carrier wavelength $\lambda_1$; the other signals simply pass straight back out on to the continuation of the same trunk fibre.

The second input and output of the first basic multiplexer unit 221 of the pair and the first input and output of the second basic multiplexer unit 222 of the pair are connected in a ring. As the second basic multiplexer unit 222 reroutes the same carrier wavelengths as the first basic multiplexer unit 221, the effect of this is that any signal rerouted from the normal path by the first basic multiplexer unit is also rerouted by the second, and vice versa: consequently, signals rerouted from the first input of the first basic multiplexer unit 221 pass to the second output of the second basic multiplexer unit 222 and signals rerouted from the Second input of the second basic multiplexer unit 222 pass to the first output of the first basic multiplexer unit 221. (The same general functionality may be achieved by using a single basic multiplexer unit rather than a matched ring—however, as discussed below, this is not amenable to loss balancing).

The second output of the second basic multiplexer unit 222 is connected to transmit signals for routing to the drop fibre to the spur station 40. Consequently, the signal at $\lambda_1$ dropped from trunk fibre 1 is routed out throught the second output of the second basic multiplexer unit 222 of the pair to be dropped to the spur station 40 on drop fibre 13. The second input of the second basic multiplexer unit 222, however, is connected to receive signals from spur station 40 received in the add/drop multiplexer 10 through add fibre 3. Signals at $\lambda_1$ from the add fibre 3 are thus received at the second input of the second basic multiplexer unit 222 of the pair, routed through the ring to the first output of the first basic multiplexer unit 221, and pass out on first trunk fibre 11 to replace the signal at $\lambda_1$ dropped to the drop fibre 13 through the basic multiplexer unit pair 221,222.

The connection between matched pairs of basic multiplexer units is achieved by an add/drop line 203 passing from the add fibre 3 to the drop fibre 13 through the second inputs and outputs of the second basic multiplexer units 228,226,224,222 of each of the matched pairs of basic multiplexer units. The add/drop line in the embodiment shown originally carries signals at $\lambda_1, \lambda_2, \lambda_3$ and $\lambda_4$ from the spur station 40 along add fibre 3. At basic multiplexer unit 228, signals at $\lambda_4$ are dropped to trunk fibre 12' and are replaced by new signals at $\lambda_4$ from trunk fibre 2'. The add/drop line then carries a combination of signals for adding to trunk fibres (at $\lambda_1, \lambda_2$ and $\lambda_3$) and a signal for dropping to the spur station 40 (at $\lambda_4$) to the next basic multiplexer unit 226. Here the signal at $\lambda_3$ is replaced, and after similar transactions at basic multiplexer units 224 and 222 the add/drop line contains only signals for dropping to spur station 40: these are dropped along spur fibre 13.

Figure 17:
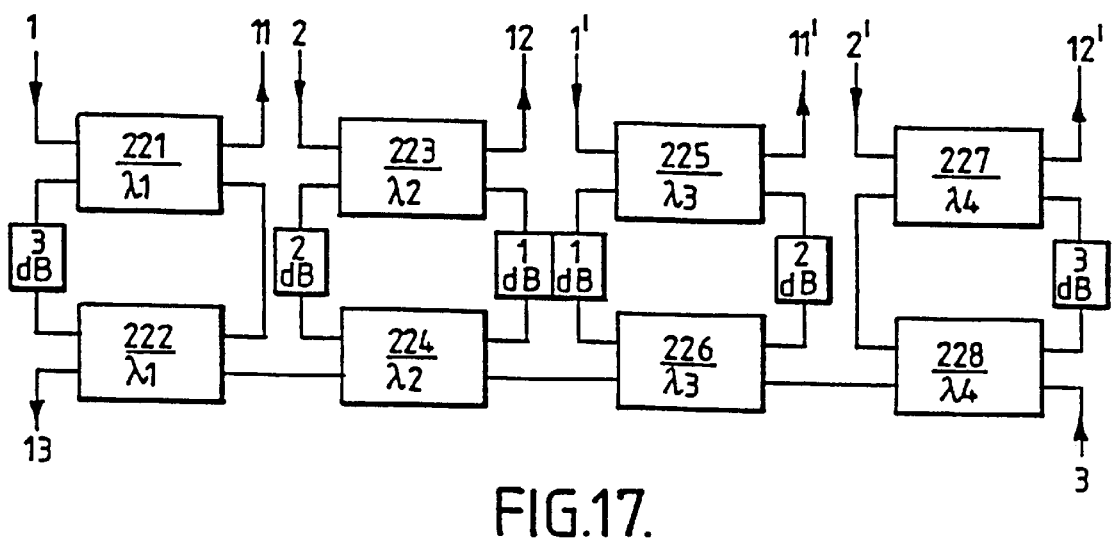
FIG. 17 shows a configuration of basic multiplexer units as shown in FIG. 16 with loss balancing.

As there will be a loss through each basic multiplexer unit, the losses in this system are asymmetrical—that is, the loss in the $\lambda_1$ signal from trunk fibre 1 to the drop fibre 13 will not be the same as that in the $\lambda_4$ signal from trunk fibre 2 to the drop fibre 13, and similarly, the loss in signals at the same respective wavelengths from the add fibre 3 to trunk fibres 11 and 12' will be different. It is desirable for efficient system design for these losses to be equalized. The design of FIG. 16 lends itself easily to such loss equalisation by the addition of fixed optical attenuators to the rings in each basic multiplexer unit pair. A loss equalised version of the FIG. 16 add/drop multiplexer is shown in FIG. 17. A loss of 1 dB for each passage through a basic multiplexer unit is assumed. Appropriate values of loss are chosen for fixed optical attenuators 231,232,233,234,235,236 so that each path between a trunk fibre and an add or drop fibre has a drop of 5 dB. The asymmetry of the attenuator values on a single ring is less at the centre than in the end pairs on the chain—this is characteristic of the network design, and becomes more marked if the chain is extended.

This design is scalable from two wavelengths or trunk fibres (i.e. an arrangement as in FIG. 6), to any number of wavelengths. There will be a simple progressive increase in losses for each increase in the number of wavelengths. This arrangement is thus particularly well adapted to modular design of fibre optic systems, and also of modular design of individual add/drop multiplexers themselves, thus offering the possibility of simpler device fabrication.

Figure 1:
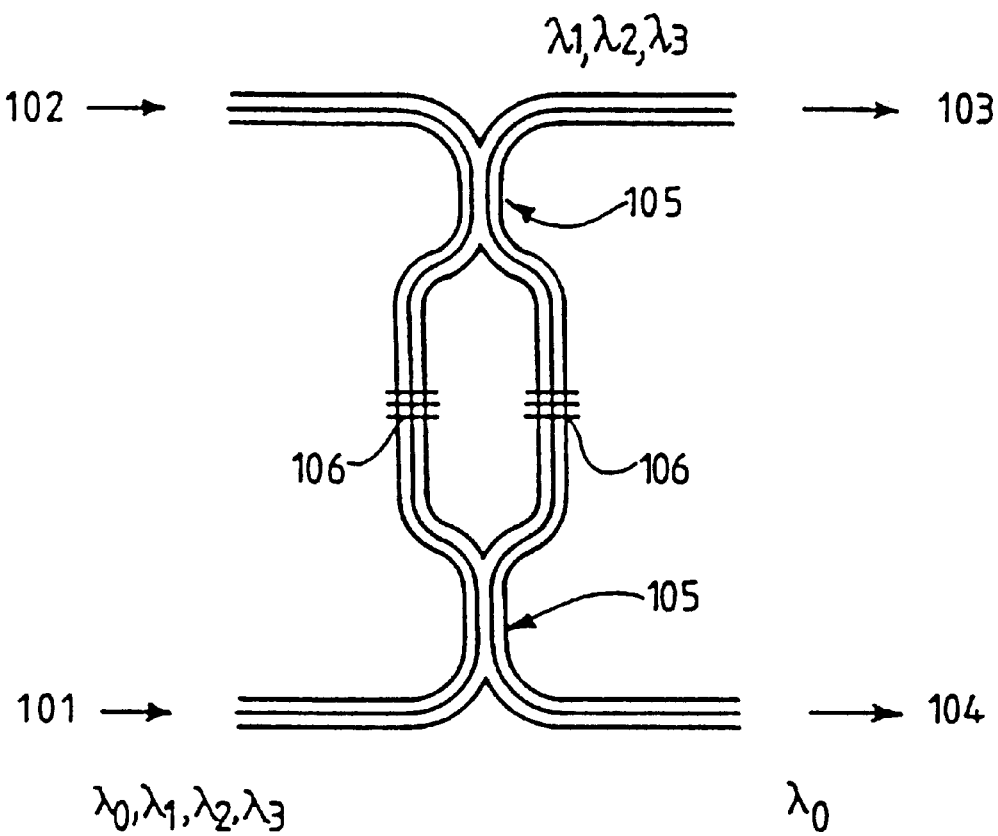
FIG. 1 shows a prior art optical tap comprising a Mach-Zehnder interferometer with Bragg reflection filters in each arm.
Figure 3:
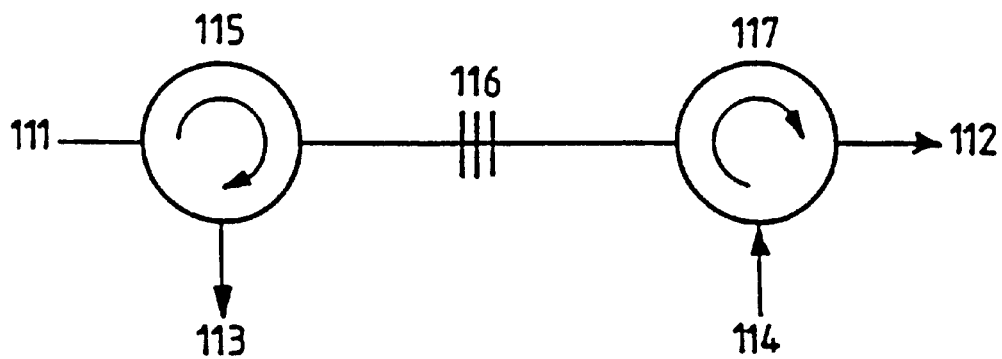
FIG. 3 shows a prior art add/drop multiplexer which employs optical circulators and a Bragg reflection filter.

The FIG. 16 add/drop multiplexer and, as indicated previously, the FIG. 14 add/drop multiplexer can both be produced using basic multiplexer units which are not Mach-Zehnder add/drop multiplexers, but which have the same functionality. A basic multiplexer unit of this functionality but which uses optical circulators in place of a Mach-Zehnder interferometer structure is that shown earlier in FIG. 3.

Figure 18:
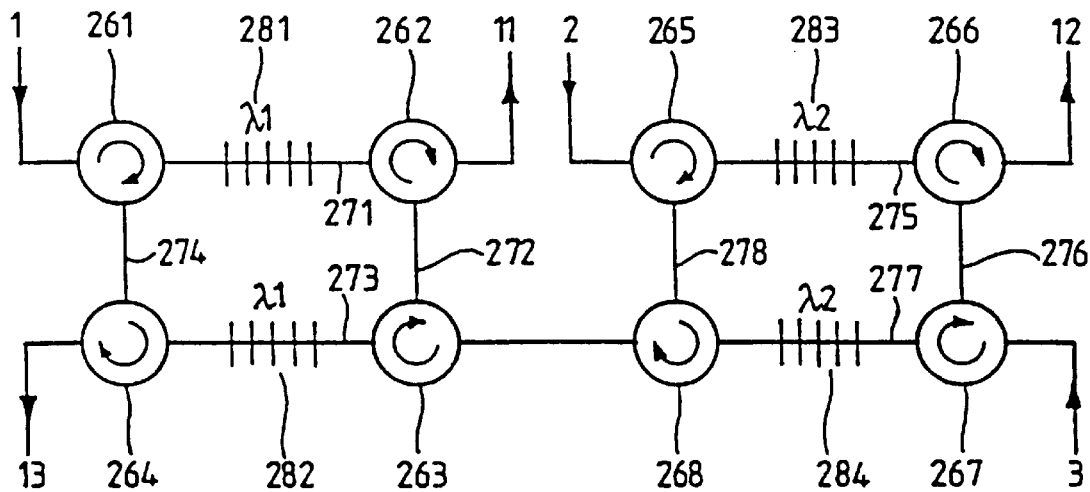
FIG. 18 shows a linear configuration of basic multiplexer units as shown in FIG. 3.

This arrangement is in principle more lossy than the Mach-Zehnder add/drop multiplexer, but is readily employable as a basic multiplexer unit in any of the add/drop multiplexer structures described above. FIG. 18 shows a two-trunk fibre version of the add/drop multiplexer of FIG. 16 adapted to employ such optical circulator basic multiplexer units. The same functionality is achieved: one matched pair of basic multiplexer units comprises optical circulators 261,262,263,264, notch reflection filters 281,282 and fibres 271,272,273,274. Losses are greater, but the same loss balancing principle as shown in FIG. 17 can be employed by appropriate choice of attenuators on fibres 272 and 274 and on equivalent fibres in other matched pairs of basic multiplexer units.

Other alternative components may be used in alternative designs of basic multiplexer unit for use in aspects of the invention. Designs based on alternative optical components, such as grating assisted couplers, are envisaged, as well as alternative arrangements employing couplers and optical circulators. Fibre Bragg gratings are preferred as notch reflection filters as they are passive fibre components, and are thus adapted for use in simple and stable design. This should render these components especially suitable for a preferred field of use of the invention, which is that of submarine fibre optic networks: in these cases, branching stations are frequently located on the sea bed several miles offshore—it is strongly desirable for all components used in this environment to be guaranteed to be stable for a substantial period of time (typically 25 years), as it is exceedingly difficult and slow to effect repairs. Alternative components may however be used to achieve the desired functionality if necessary: for example, if fibre Bragg gratings cannot provide a desired level of temperature stability. Temperature compensation may however be achieved by use of temperature gratings, obtainable by straining the grating to compensate for any thermal change in refractive index, or by fixedly mounting the grating on a ceramic of negative temperature coefficient to provide an alternative, physical, compensation mechanism. However, basic multiplexer units for use in this aspect of the invention do not necessarily require fibre Bragg gratings or any other form of notch reflection filter as components, although these are particularly advantageous—the man skilled in the art can readily devise alternative basic multiplexer units of the same functionality from other known optical components.

Figure 19:
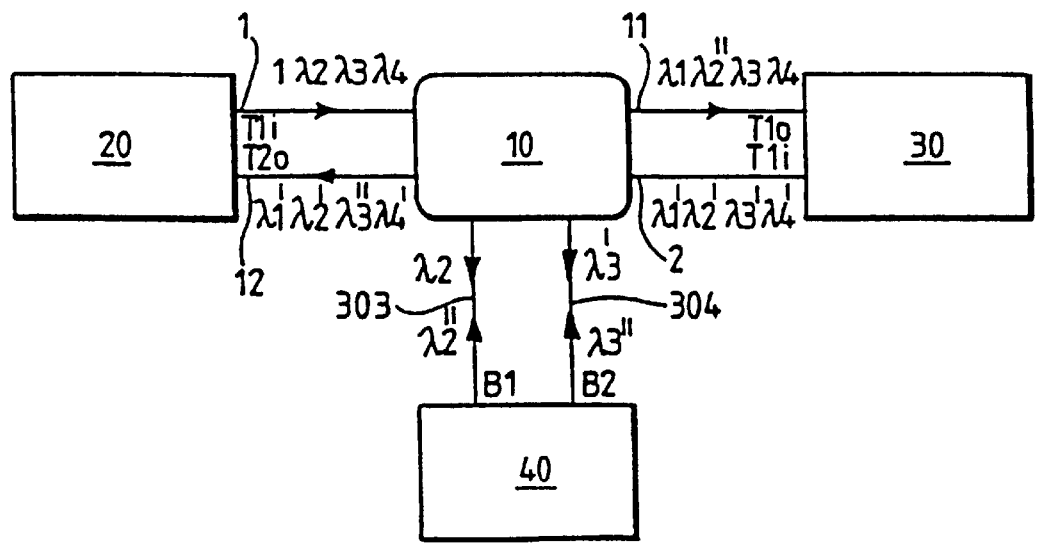
FIG. 19 shows a still further routing scheme.

FIG. 19 shows a fibre optic network adapted to utilise a branching unit with an add/drop multiplexer. The fibre optic network has a trunk with a first trunk fibre 1,11 and a second trunk fibre 2,12, terminal stations 20 and 30 and a branch station 40, with a branching unit 10 generally as described for, say, FIG. 6. However, the add/drop multiplexer 10 also has first and second branching input/outputs 303,304, and the branching unit 10 is adapted both to input one or more branch input signals and output one or more branch output signals at each of these inputs/outputs.

As the spur fibres are used for bidirectional transmission, they are not provided with repeaters. The relevant signals at given carrier wavelengths, also termed channels, can be simply combined and/or separated at branch station 40 by the use of a fibre optic coupler or an optical circulator. Use of an optical circulator is advantageous as this involves lower losses. Such a configuration allows the use of properties associated with the bidirectional transmission to determine where the channels are routed, and obviates any need for extra fibres.

Figure 20:
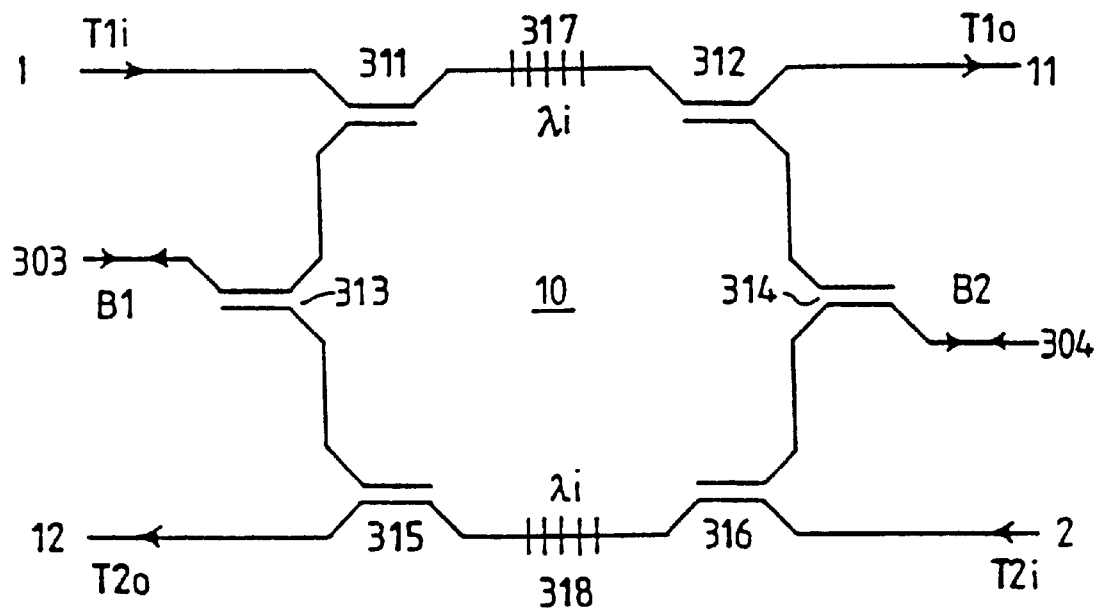
FIG. 20 shows aothern add/drop multiplexer.

This topology can be achieved by several different arrangements of components. A tenth embodiment of the invention is depicted in FIG. 20. This employs a plurality of optical fibre couplers and wavelength routing means. The preferred wavelength routing means are notch reflection filters, and in particular fibre Bragg gratings, but alternative components with the same or comparable functionality could also be used.

The FIG. 20 arrangement is adapted for use as branching unit 10 in FIG. 19. It comprises six fibre optic couplers 311, 312, 313, 314, 315 and 316 and two fibre Bragg gratings 317, 318. With regard to the first trunk fibre 1,11, an input signal is received at a first left side connection of fibre optic coupler 311 and an output signal is provided at a first right side connection of fibre optic coupler 312. Similarly, for the second trunk fibre 2,12, an input signal is provided at the second right side connection of coupler 316 and an output signal is provided at a second left side connection of coupler 315. A first branching unit bi-directional spur 303 is connected to the left side of coupler 313, and a second bi-directional spur 304 is connected to the right side of coupler 314. The couplers are connected in a ring. The right side connections of coupler 313 are connected to the free left side connections of couplers 311 and 315 respectively, and the left side connections of coupler 314 are connected to the free right side connections of couplers 312 and 316 respectively. The remaining linkages are those provided between the right side of coupler 311 and the left side of coupler 312, and between the right side of coupler 315 and the left side of coupler 316. These connections are each achieved by means of fibres having therein one or more fibre Bragg gratings. On the fibre between couplers 311 and 312 there is fibre Bragg grating 317, and on the fibre between couplers 315 and 316 there is fibre Bragg grating 318.

The design shown is effective when the same wavelength, in this case $\lambda_i$, is add/dropped on both trunk fibre 1,11 and trunk fibre 2,12. All other wavelengths passed straight along the first trunk and straight along the second trunk. However, signals at $\lambda_i$ on the first trunk passed through coupler 311, are reflected at grating 317 and pass out through couplers 311 and 313 along spur fibre 303. In similar fashion, signals at this wavelength arriving on the second trunk fibre 2 pass out along spur fibre 304. Signals at this wavelength arriving on spur fibre 303 are reflected at grating 318 after passing through couplers 313 and 315 and pass back out through coupler 315 onto second trunk fibre 12. Similarly, signals arriving at this wavelength along spur fibre 304 pass out along first trunk fibre 11.

This design can be modified by inclusion of optical isolators to enable different wavelengths to be added or dropped from different fibres: the optical isolators serve to reduce crosstalk to acceptable levels.

By using optical circulators and fibre Brag; gratings the restriction of dropping only the same wavelength can be lifted. In the following embodiments, the same or different wavelengths can be used for adding and dropping signals for the different fibres.

Figure 21:
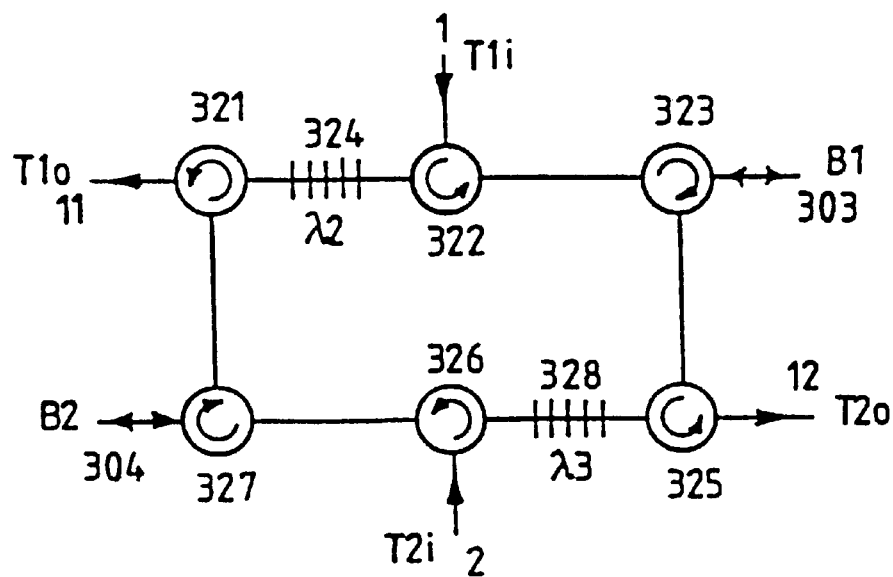
FIG. 21 shows a further add/drop multiplexer.

FIG. 21 shows an arrangement using three-port optical circulators. Again, the arrangement of FIG. 21 is adapted to provide a branching unit 10 for the topology of FIG. 19. In the arrangement of FIG. 21, the input signals, output signals, branch input signals and branch output signals effectively comprise two sets, each set comprising one input signal, one output signal, one branch input signal and one branch output signal, in such a way that three three-port optical circulators and one wavelength routing means, here a Fibre Bragg grating, are provided for each set.

A first set comprises optical circulators 321, 322 and 323 and fibre Bragg grating 324. The first three-port optical circulator is adapted to receive at its first port signals from the second "set", communicates through its second port with the second port of the second optical circulator 322 of the set through wavelength routing means 324, and from the third port provides an output signal, in this case for first trunk fibre 11. The remaining ports of the second optical circulator 322 are connected such that the first port receives an input signal, in this case again from the first trunk fibre 1, and the third port connects to the first port of the third optical circulator 323 of the set. The second port of optical circulator 323 is connected to spur fibre 303 and the third port of optical circulator 323 is adapted to provide signals to the circulators of the other set.

In the case depicted, signals input on along the first trunk fibre 1 all pass through circulator 322 to fibre Bragg grating 324. Signals at all wavelengths other than $\lambda_2$ pass straight through grating 324 and circulator 321 out along first trunk fibre 11. Signals at $\lambda_2$ are reflected at grating 324 and passed back through circulator 322 to circulator 323 and then out onto spur fibre 303. Signals arriving from spur fibre 303 are circulated out through circulator 323 and into the first circulator, circulator 325, of the second set. Likewise, signals from the spur fibre 304 of the other set appear (via circulator 327) at the first port of optical circulator 321. These pass through to grating 324, and signals at $\lambda_2$ are reflected back through circulator 321 and out onto the first trunk fibre to replace the signals dropped to spur fibre 303. Similar results are achieved by the second set of circulators, with signals at wavelengths other than $\lambda_3$ passing straight along the second trunk fibre, and with signals at $\lambda_3$ being dropped to spur fibre 304 and replaced from spur fibre 303.

Figure 22:
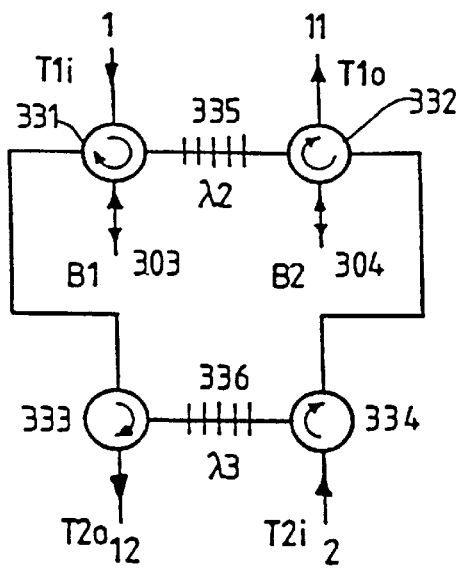
FIG. 22 shows another add/drop multiplexer.

FIG. 22 shows a modified version of this arrangement which reduces the number of components by replacing one pair of three-port optical circulators with a four-port optical circulator, with a consequent rearrangement in the connections provided. Achieving the FIG. 19 arrangement thus requires a first and a second four-port circulator, a first and a second three-port circulator and a first and a second wavelength routing means. Each of the to four-port circulators is connected at one port to a trunk input or output, at another port to a branch input/output, at another port to one of the three-port circulators, and through the other port to the other four-port circulator through wavelength routing means 335. In this case, the first trunk input passes into first four-port circulator 331 at the first port, the second port of circulator 331 communicates with second four-port circulator 332 through wavelength routing means 335, which here is a Bragg reflection filter centered at $\lambda_2$, the third port of circulator 331 connects with first branch input/output 303, and the fourth port of circulator 331 connects with the first port of a first three-port circulator 333. The connections to the second four-port circulator 332 are effectively in reverse: the first port is connected to the third port of the second three-port circulator 334, the second port is connected to the other branch input/output 304, the third port is connected to the other four-port circulator 331 through wavelength routing means 335, and the final port provides the signal for the first fibre output. The two three-port circulators 333 and 334 are connected to each other, through their second ports, by the other wavelength routing means 336, which is here a fibre Bragg grating reflecting at $\lambda_3$. Again, the first circulator of this type is effectively mirrored by the second circulator of this type, the third-port of circulator 333 providing the signal for the second trunk output fibre and the first port of the second three-port circulator 334 receiving the signal from the second trunk input fibre.

The passage of signals through this arrangement is similar to that for the FIG. 21 embodiment. For the first trunk fibre, signals at all wavelengths other than $\lambda_2$ pass straight through circulator 331, wavelength routing means 335, and circulator 332 to the first trunk fibre output 11. Signals at $\lambda_2$ are reflected by wavelength routing means 335 and pass out along the first branch input/output fibre 303. Likewise, on the second trunk fibre, signals at wavelengths other than $\lambda_3$ pass straight through to the corresponding output fibre 12, whereas signals at $\lambda_3$ are reflected by wavelength routing means 336 and re-circulated by circulator 334 to circulator 332, where they then pass out to the second branch input/output fibre 304. Signals at $\lambda_3$ from first branch input/output fibre 303 are circulated through circulator 331 and circulator 333 to wavelength routing means 336, where they are reflected and re-circulated by circulator 333 to the second trunk fibre output 12 to replace the signal dropped to branch input/output 304. Similarly, the replacement signal from the second branch input/output 304 at $\lambda_2$ passes through circulator 332, reflects from wavelength routing means 335 and is circulated again by circulator 332 to pass out along the first trunk fibre output.

This arrangement is in some ways advantageous over that shown in FIG. 21. Not only are the number of components reduced, the loss in the signal on the dropped channels will be reduced as these pass through fewer components.

Figure 23:
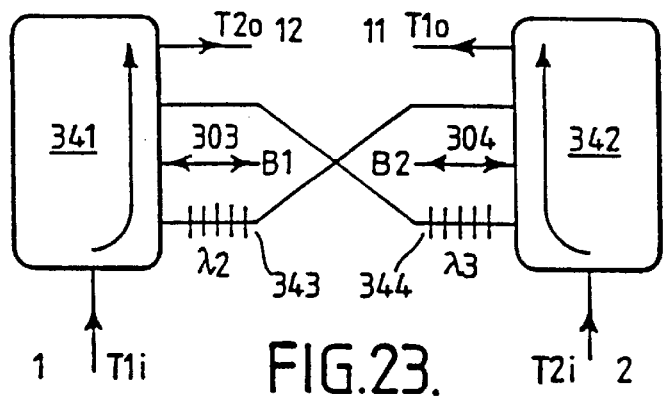
FIG. 23 shows another add/drop multiplexer.

An even smaller number of components is achieved in the arrangement shown in FIG. 23. This employs only two optical components for each set of a trunk and branch fibre in achieving a topology of FIG. 19. One of these optical components is a five-port optical circulator. These can be achieved in practice by using five ports of a six-port circulator such as those available commercially, for example, from JDS Fitel Inc. of Nepean, Ontario, Canada. The other component is a wavelength routing means, in this case a fibre Bragg grating.

Here there is essentially a symmetric arrangement between the first five-port optical circulator 341 and the second five-port optical circulator 342. In each case, a trunk input fibre inputs a signal to the first port. The second port is connected to the fourth port of the other five-port optical circulator through wavelength routing means 343, 344. The third port is connected to a branch input/output fibre 303, 304. The fifth port is connected to a trunk fibre output. In this case, for a given five-port optical circulator the trunk fibre input connected to the first port relates to one trunk fibre, but the trunk fibre output connected to the fifth port relates to the other trunk fibre.

The functionality of the device is essentially that of the arrangement shown in FIGS. 21 and 22. Signals from the first trunk fibre at wavelengths other than $\lambda_2$ pass into the first port of circulator 341, through wavelength routing means 343, and then into the fourth port and out through the fifth port of circulator 342 onto the first trunk fibre output 11. Signals at $\lambda_2$ are reflected back into the second port of circulator 341 and pass out through the third port onto branch input/output fibre 303. These signals at $\lambda_2$ are replaced on the first trunk output fibre by signals received from the second branch input/output 304. These pass into the third port of circulator 342 and out through the fourth port of this circulator, are then reflected by wavelength routing means 343 back to the fourth port of circulator 342, and so also pass out through the fifth port of circulator 342. In the same fashion, the signals at wavelengths other than $\lambda_3$ pass directly along the second trunk fibre, whereas signals at $\lambda_3$ are dropped to the second branch input/output 304 and are replaced from the first branch input/output 303.

A particular advantage of this arrangement is that losses are balanced if the component losses from port to port are equal. In this case, if it assumed that the optical circulator has a 1 dB loss per circulation and the wavelength routing means, here a fibre Bragg grating, has a 0.5 dB loss both in reflection and transmission, then the port to port loss of this configuration is 2.5 dB. This represents the minimum loss for a circulator and grating configuration, and provides an improvement upon the three and four-port arrangements. There are thus the considerable advantages in this design of a very low component count, of low and balanced losses, and of the opportunity to add and drop the same or different wavelengths from trunk fibres in different directions.

Figure 24:
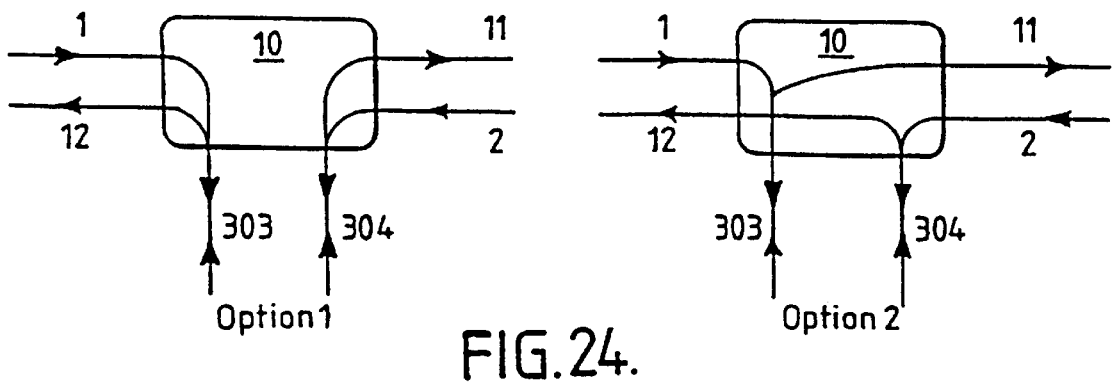
FIG. 24 shows alternative routing options within a branching unit where bidirectional spurs are used.

The arrangement shown in FIG. 23 uses a given branch input/output to drop signals from one trunk at one wavelength and to replace signals on the other trunk at a different wavelength. This is in accordance with the drawing indicated "option 1" in FIG. 24. However, an alternative routing option is available, in which a given branch input/output is used for dropping and replacing signals to the same fibre—this is shown in "option 2" of FIG. 24.

Figure 25:
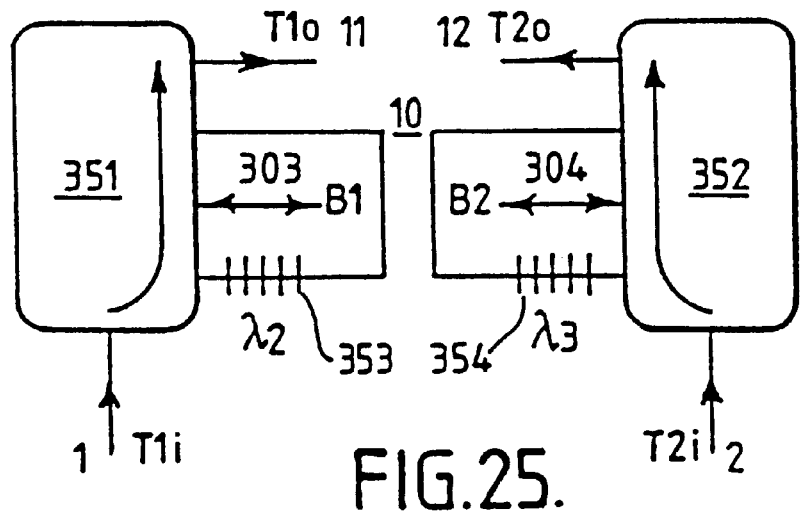
FIG. 25 shows another add/drop multiplexer.

The option 2 routing can also be achieved with use of a five-port circulator arrangement similar to that shown in FIG. 23. Such an arrangement is shown in FIG. 25. The arrangement differs to that in FIG. 23 in that for each circulator, the trunk fibre input and the trunk fibre output connected to the first and fifth ports respectively relate to the same trunk fibre. In addition, the connection between second and fourth ports is different: instead of the second port of one circulator being connected to the fourth port of the other, the second and fourth ports of the same circulator are connected together with wavelength routing means 353, 354 therebetween. This achieves the routing arrangement of option 2. For first five-port circulator 351, signals are input from the first trunk fibre at the first port. Those signals at wavelengths other than $\lambda_2$ pass out through the second port and are transmitted directly through wavelength routing means 353 to the fourth port, and are circulated out to the first output fibre through the fifth port. However, signals at $\lambda_2$ are reflected by wavelength routing means 353 and pass out through the third port onto first branch input/output 303. They are then replaced by signals at the same wavelength from branch input/output 303. The replacement signals are circulated out through the fourth port, are reflected by wavelength routing means 353 back to the fourth port, and consequently pass through to the fifth port and out onto the first trunk fibre. The arrangement for the second five-port circulator 352 is similar, with signals at $\lambda_3$ dropped to second branch input/output 304 and replaced by new added signals at the same wavelength.

The loss performance of the FIG. 23 and FIG. 25 configurations is substantially identical, within device tolerances. In the pure FIG. 19 topology, the choice of these two arrangements is unlikely to be of particular importance—however, in modified routing arrangements employing active switching, it is likely that one routing or the other will be more suitable for a given circumstance.

Bi-directional spur arrangements such as those indicated in connection with FIG. 19 are appropriate where the length of fibre to the branch station 40 is relatively short, as the performance of the branching unit can then be enhanced without significant degradation of the signals relating to the branch station. It is possible for signals to and from the bi-directional spurs to be separated or combined at the branch station 40 by use of a fibre optic coupler or an optical circulator: use of an optical circulator will generally be preferred as this will reduce losses. However, it is not in all cases appropriate to use such an arrangement, as the distance to the branch station may be too great to allow signals to be transmitted between branch station and branching unit without amplification. In such cases, essentially the same form of branching unit can be employed instead of existing arrangements by addition of an appropriate exchange unit to combine and split signals at the branching unit, rather than at the terminal station. The functionality shown earlier in FIG. 6 results.

Figure 26:
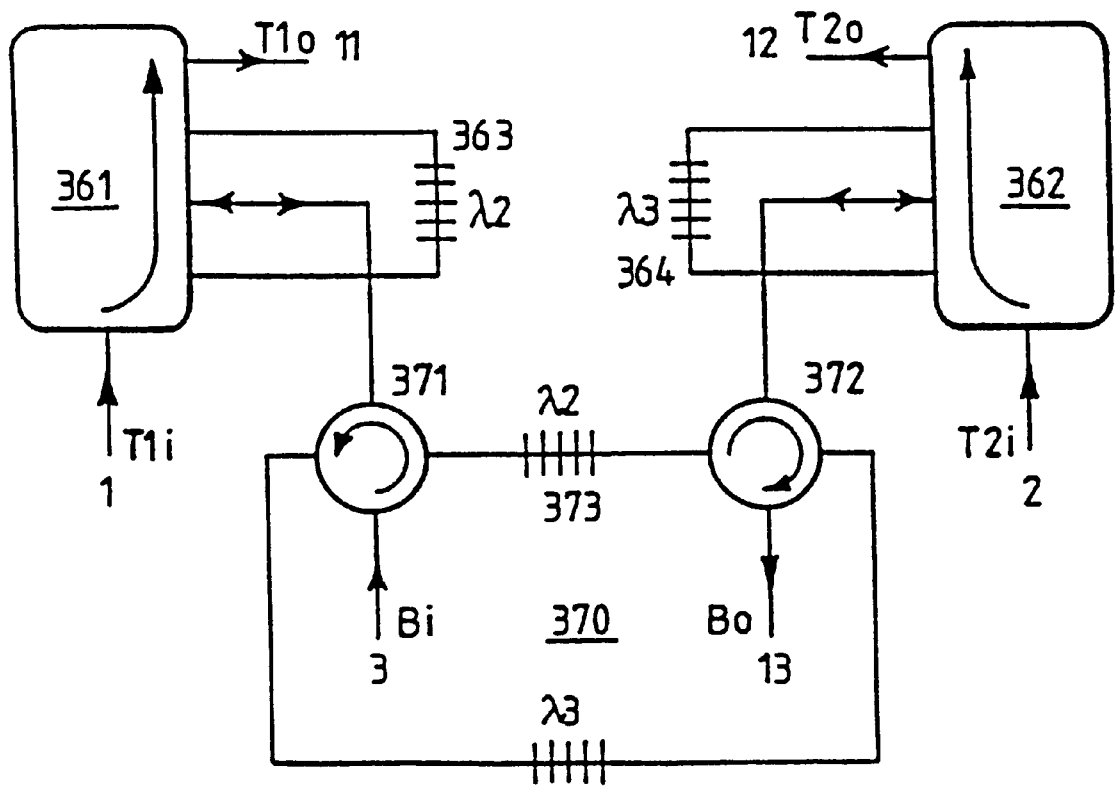
FIG. 26 shows another add/drop multiplexer.

The FIG. 6 routing scheme is achieved very efficiently in component usage by the FIG. 10 device. However, this device has the disadvantage that the losses from port to port vary from 2.5 to 5 dB, assuming a loss of 1 dB for each circulation and a loss of 0.5 dB for transmission through or reflection from a grating. Such a lack of balance in losses is undesirable from the point of view of the system, as it then becomes difficult to balance the power in each wavelength division multiplexed channel, such power balance being important for optimum transmission performance. A modification of a bi-directional spur design by addition of an exchange unit to provide unidirectional spurs is shown in FIG. 26. The basic arrangement shown is that of FIG. 25, though it can be appreciate that modified forms of other bi-directional spur arrangements indicated above can be employed.

The arrangement of FIG. 26 differs from that of FIG. 25 only in that the third ports are now connected to the exchange unit, rather than to branch inputs/outputs directly. The routing of signals not to be exchanged with the branch is unaffected. Signals at $\lambda_2$ are dropped from the first trunk fibre into the exchange unit 370 from the third port of the first five-port circulator 361. The exchange unit 370 comprises two four-port circulators 371, 372 and two wavelength routing means 373, 374, here fibre Bragg gratings at $\lambda_2$ and $\lambda_3$. The signal at $\lambda_2$ received from the first five-port circulator enters the third port of the first four-port circulator 371 of the exchange unit and is circulated to the fourth port. This signal passes to second wavelength routing means 374, centered at $\lambda_3$, and thus passes straight through this component to the third port of second four-port circulator 372. This signal is circulated to the fourth port, and out to the branch output fibre 13. The replacement signal at $\lambda_2$ is provided along the branch input fibre 3 to the first port of first four-port circulator 371 of the exchange unit 370. The signal is circulated out through the second port and reflected at first wavelength routing means 373, which is centred at $\lambda_2$, back to the first four-port circulator 371 and out through the third port back to the third port of first five-port circulator 361. The behaviour for the second trunk fibre is essentially similar in relation to signals at $\lambda_3$. These are dropped from the trunk through the third port of second five-port circulator 362, are passed into the second and out through the third port of second four-port circulator 372 of the exchange unit, are then reflected by wavelength routing means 374 and eventually pass out of the fourth output of second four-port circulator 372 to branch output fibre 13. Similarly, signals at $\lambda_3$ are provided by branch input fibre 3 through circulator 371, grating 373, and circulator 372 to the third port of circulator 362.

This design is particularly advantageous, in that it provides a balanced loss budget. A comparison of the losses of the designs of FIG. 10 and FIG. 26 is shown in Table 2 below.

TABLE 2

Routing loss comparison

| Routing | Loss (dB) | |
|---|---|---|
| | FIG. 10 | FIG. 26 |
| T1i → T1o | 2.5 | 2.5 |
| T2i → T2o | 3.5 | 2.5 |
| Bi → T1o | 3.5 | 5.0 |
| Bi → T21o | 5.0 | 5.0 |
| T1i → Bo | 4.0 | 5.0 |
| T2i → Bo | 3.5 | 5.0 |

This assumes a loss of 1 dB for each circulation and of 0.5 dB for reflection from or transmission through a grating. As can be seen, a low loss of 2.5 dB is achieved for direct passage along a trunk fibre, with a larger but consistent loss of 5.0 dB for dropping a signal to a branch fibre or for adding a signal from a branch fibre. A greater number of components are used than in FIG. 10, but the improved loss budget may provide compensatory advantages in practice.

As can be seen from the above, use of bi-directional spurs in branching units of wavelength division multiplexed fibre optic systems can be particularly advantageous to reduce losses and to provide simple systems. Particularly simple and convenient systems are provided by the use of five-port optical circulators. Bi-directional spur arrangements can be used in conjunction with appropriate hardware within a branch station to split and combine signals as appropriate: alternatively, an exchange unit can be provided within the branching unit to enable the advantageous design of bi-directional spur branching units, particularly those employing five-port circulators, to be modified for use with uni-directional spur fibres carrying either signals from the branch station to the branching unit or signals from the branching unit to the branch station.

We claim:

1. An add/drop multiplexer for use in optical wavelength division multiplexing, the add/drop multiplexer having a first trunk input port (1) for receiving traffic signals from a first part of a first trunk fibre, a second trunk input port (2) for receiving traffic signals from a first part of a second trunk fibre, a first trunk output port (11) for outputting traffic signals to a second part of the first trunk fibre, a second trunk output port (12) for outputting traffic signals to a second part of the second trunk fibre, and a branch input port (3) for receiving traffic signals from a branch input fibre, and/or a branch output port (13) for outputting traffic signals to a branch output fibre;

the add/drop multiplexer comprising:
means (21, 22) for routing from the first trunk input (1) to the branch output (13) a first set of traffic signals ($\lambda_4$, $\lambda_7$, $\lambda_{10}$.) at carrier wavelengths predetermined for transmission of signals from the first trunk fibre to a branch station (40) and for routing from the second trunk input (2) to the branch output (13) a second set of traffic signals ($\lambda_2$, $\lambda_5$, $\lambda_{12}$) at carrier wavelengths predetermined for transmission of signals from the second trunk fibre to the branch station (40), and means (33) for combining said first and second sets of traffic signals for output at the branch output; and/or means (23) for separating traffic signals ($\lambda_1$, $\lambda_8$, $\lambda_{11}$) received at the branch input (3) into a third set of traffic signals ($\lambda_1$, $\lambda_8$, $\lambda_{11}$) at carrier wavelengths predetermined for transmission of signals from the branch station (40) to the first trunk fibre and a fourth set of traffic signals ($\lambda_1$, $\lambda_8$, $\lambda_{11}$) at carrier wavelengths predetermined for transmission of signals from the branch station to the second trunk fibre, and means (31) for routing the third set of traffic signals ($\lambda_1$, $\lambda_8$, $\lambda_{11}$) to the first trunk output (11) and the fourth set of traffic signals ($\lambda_1$, $\lambda_8$, $\lambda_{11}$) to the second trunk output (12) respectively.

2. An add/drop multiplexer as claimed in claimd in claim 1, the branch input and branch output is to an from a common input/output branch fibre.

3. An add/drop multiplexer as claimed in claim 2, wherein two branch input/outputs (303, 304) are provided, and wherein the add/drop multiplexer further comprises means (316, 318, 314) for routing from the second trunk input (2) to a second branch input/output (304) a third set of traffic signals ($\lambda_3'$) at carrier wavelengths predetermined for transmission of signals from said second trunk fibre to the branch station (40), and means for routing from the second branch input/output (304) to the trunk output (12) of a second one of the first and second trunk fibres a fourth set of traffic signals ($\lambda_3''$) at carrier wavelengths predetermined for transmission of signals from the branch station to the second one of the first and second trunk outputs.

4. An add/drop multiplexer as claimed in claim 1, for use in an optical wavelength division multiplexing system in which specific carrier wavelengths are assigned for transmission between different stations in the system, said add/drop multiplexer comprising:

signal splitting means (21, 22, 23) to split the traffic signals input from each of said input ports (1, 2, 3) into signals for provision to selected output ports (11, 12, 13) in accordance with a routing determined by the carrier wavelengths of said traffic signals;

signal coupling means (31, 32, 33) for providing output traffic signals at each of said output ports (11, 12, 13), wherein for each one of said trunk output ports (11, 12) traffic signals ($\lambda_4$, $\lambda_7$, $\lambda_{10}$; $\lambda_1$, $\lambda_8$, $\lambda_{11}$, or $\lambda 1$ $\lambda 2 \lambda 3$) the corresponding trunk input port and from the branch input port at carrier wavelengths selected for routing to that trunk output port (11, 12) are combined for output to that trunk fibre, and wherein for the branch output port traffic signals ($\lambda_4$, $\lambda_5$, $\lambda_6$) from the trunk input ports at carrier wavelengths selected for routing to the branch station (40) are combined for output on the branch output fibre.

5. An add/drop multiplexer as claimed in claim 4, wherein the signal coupling means (31, 32, 33) comprises a fibre optic coupler for each one of said output ports (11, 12, 13) to couple signals received from said signal splitting means (21, 22, 23) after routing to said one of the output ports (11, 12, 13).

6. An add/drop multiplexer as claimed in claim 4 or claim 5, wherein the signal splitting means (21, 22, 23) comprises a fibre optic coupler for each of the input ports (1, 2, 3), the fibre optic coupler for any given one of said input ports having at a first side of the coupler an input fibre from said one of the input ports (1, 2, 3) and at a second side of the coupler two output fibres, said two output fibres being in the case of a trunk input port (1, 2) for routing signals to the corresponding trunk output port (11, 12) and to the branch output port (13), and in the case of the branch input port (3) for routing signals to the first and second trunk output ports (11, 12).

7. An add/drop multiplexer as claimed in claim 6, wherein a filter (41) is provided for signals routed to the branch output port (13) which is adapted to transmit carrier wavelengths ($\lambda_4$, $\lambda_5$, $\lambda_6$) assigned for transmission of signals to the branch output fibre but which is not adapted to transmit carrier wavelengths not assigned for transmission of signals to the branch output fibre (13).

8. An add/drop multiplexer as claimed in claim 4 or claim 5, wherein the signal splitting means comprises for each of said input ports (1, 2, 3) a component or set of components with an input path for receiving signals from said one of said input ports (1, 2, 3) and with first and second output paths for routing signals to a first one of said output ports (11, 12, 13) and a second one of said output ports (13, 13, 12) respectively, wherein on said first output path there are one or more notch reflection filters (54) for reflecting signals at carrier wavelengths assigned for transmission to said second one of said output ports (12) and for transmitting signals at carrier wavelengths assigned for transmission to said first one of said output ports, and wherein signals at carrier wavelengths assigned for transmission to said second one of said output ports (12) are routed after reflection at said notch reflection filters on to said second output path.

9. An add/drop multiplexer as claimed in claim 8, wherein the component or set of components comprises a fibre optic coupler (51, 52, 53) in which the input path and the second output path are provided on fibres connected to a first side of the coupler and the first output path is provided on a fibre connected to a second side of the coupler.

10. An add/drop multiplexer as claimed in claim 9, further comprising in the second output path of the fibre optic coupler (51) to which the first input port (1) provides an input an optical isolator (59), which allows transmission of signals from said fibre optic coupler, but which does not allow transmission of signals towards said fibre optic coupler, wherein said second output path provides an input to the fibre optic coupler (32) for splitting the signal from the second input port, the second output path from the fibre optic coupler (31) for the first input port being connected to the second side of the fibre optic coupler (58) for the second input port (2), the fibre optic coupler for the second input port (2) thereby also serving as the signal coupling means for the branch output port (13).

11. An add/drop multiplexer as claimed in claim 8 wherein said component or set of components comprises an optical circulator (61, 62, 63) for which a first port in sequence is connected to the input path, a second port in sequence is connected to the first output path, and the third port in sequence is connected to the second output path.

12. An add/drop multiplexer as claimed in claim 11 wherein for each one of the output ports the signal coupling means comprises an optical circulator 64, 65, 66), a first port in sequence of said optical circulator being for receiving signals routed from a first one of said input ports (1, 2, 3), a second port in sequence of said optical circulator being for receiving signals routed from a second one of said input ports (1, 2, 3), and a third port in sequence of said optical circulator being for providing signals to said one of the output ports (11, 12, 13), wherein one or more notch reflection filters (54, 67, 67, 68) are provided on a fibre connected to the second port in sequence to reflect signals at carrier wavelengths assigned for transmission of signals from said first one of said input ports to said one of the output ports.

13. An add/drop multiplexer as claimed in claim 8, wherein the carrier wavelengths assigned for transmission into the first trunk input port (1) are the same carrier wavelengths as assigned for transmission of signals out of the second trunk output port, the carrier wavelengths assigned for transmission into the second trunk input port (2) are the same carrier wavelengths as assigned for transmission out of the first trunk output port, and the carrier wavelengths assigned for transmission into the branch input port (3) are the same carrier wavelengths as assigned for transmission out of the branch output port.

14. An add/drop multiplexer as claimed in claim 8, said multiplexer comprising three or more four port optical circulators (71, 72, 73), wherein for each of said four port optical circulators, the optical circulator is configured such that one of said input ports (1, 2, 3) is connected to one of said four ports of the circulator, one of said output ports (11, 12, 13) is connected to another of said four ports, and the other two ports of said four ports are each connected to a different one of said optical circulators (71, 72, 73), and wherein said one or more notch reflection filters (77, 78) are provided in the paths connecting pairs of said optical circulators.

15. An add/drop multiplexer as claimed in claim 14, wherein for each of said four port circulators (71, 72, 73), a first port in sequence is connected to one of said input ports (1, 2, 3), a second port in sequence is connected to one of the other four port circulators (72, 73, 72), a third port in sequence is connected to another one of the other four port circulators (73, 71, 71), and a fourth port in sequence is connected to one of said output ports (12, 11, 13).

16. An add/drop multiplexer as claimed in claim 14, wherein the add/drop multiplexer comprises four or more four port optical circulators and the four port optical circulators are connected to each other in a ring, wherein an additional branch input port and branch output port are provided for each four port optical circulator beyond the third.

17. An Add/drop multiplexer as claimed in claim 8 where said notch reflection filters are fibre Bragg gratings.

18. A branching unit for use in a fibre optic network which branching unit comprises a first trunk input port (1) for receiving traffic signals from a first part of a first trunk fibre, a second trunk input port (2) for receiving traffic signals from a first part of a second trunk fibre, a first trunk output port (11) for outputting traffic signals to a second part of the first trunk fibre, a second trunk output port (12) for outputting traffic signals to a second part of the second trunk fibre, and a branch input port (3) for receiving traffic signals from a branch input fibre, and/or a branch output port (13) for outputting traffic signals to a branch output fibre and includes an add/drop multiplexer as claimed in any preceding claim.

19. A fibre optic network, comprising two terminal stations, two or more trunk fibres connecting said two terminal stations, one or more branch stations each connected by a spur fibre to a fibre trunk defined by said two or more trunk fibres, and one or more branching units as claimed in claim 18 on the fibre trunk each to allow exchange of traffic signals between said trunk fibres and one or more of said spur fibres.

20. A fibre optic network as claimed in claim 19 and adapted such that a substantial part of said fibre trunk comprises submarine cable, and in that said one or more branching units are adapted for submarine use.

* * * * *